Nov. 7, 1967　　　　　H. N. K. PATON　　　　　3,351,235
INTERNAL MEMBRANE MECHANISM AND METHOD FOR UNLOADING
MATERIAL FROM CONTAINERS
Filed Oct. 30, 1964　　　　　　　　　　　　　12 Sheets-Sheet 1
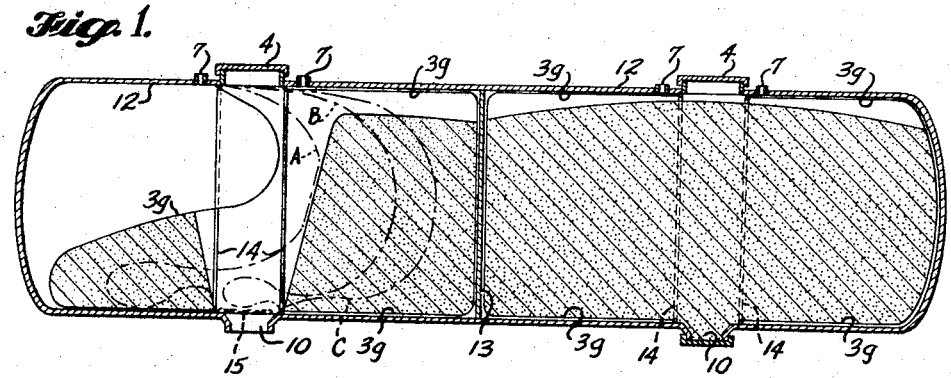
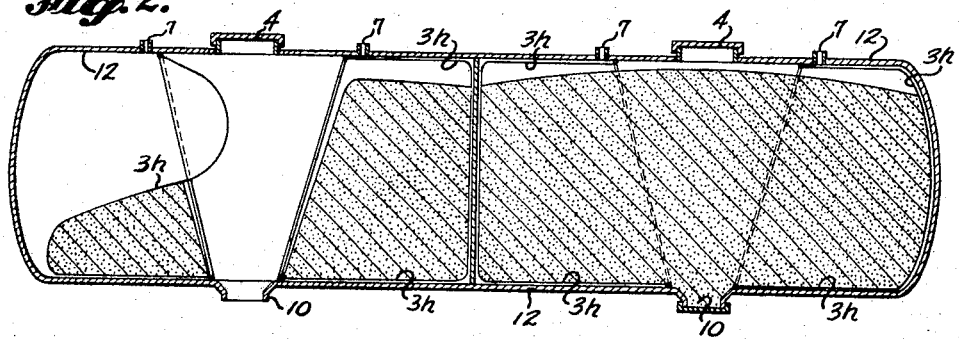
INVENTOR.
HAMILTON NEIL KING PATON
BY
ATTORNEY

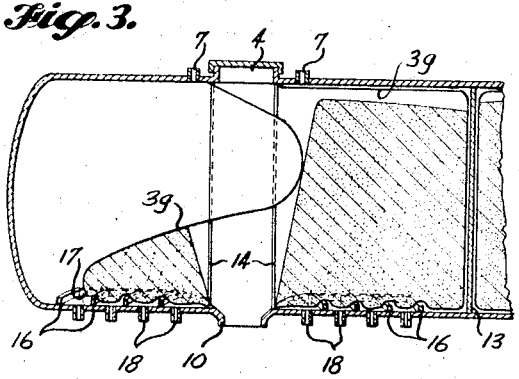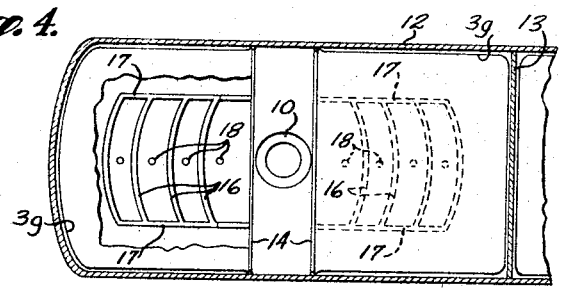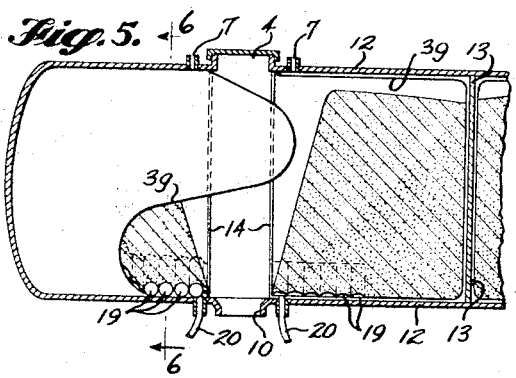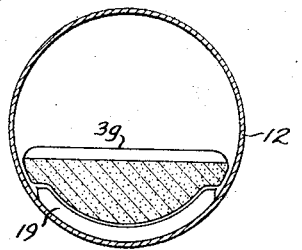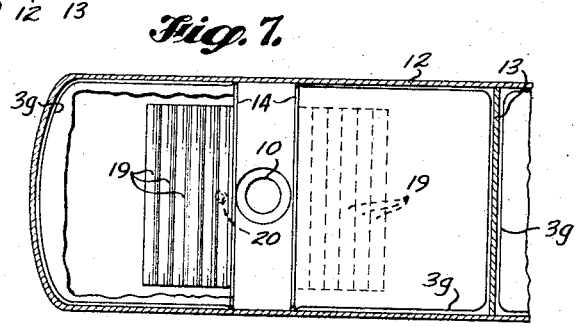

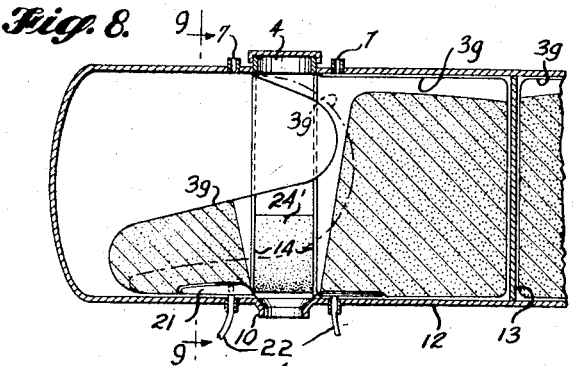
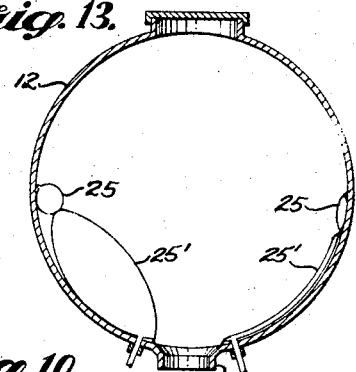
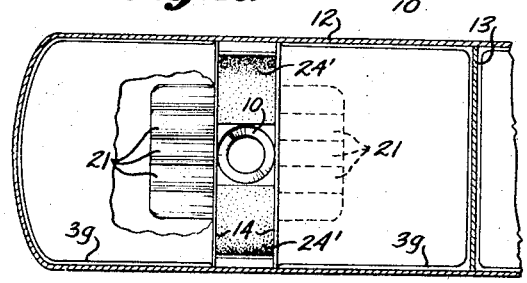
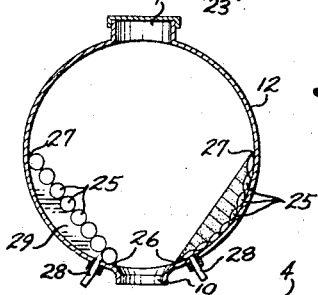
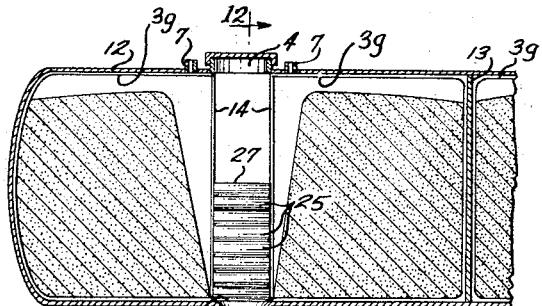
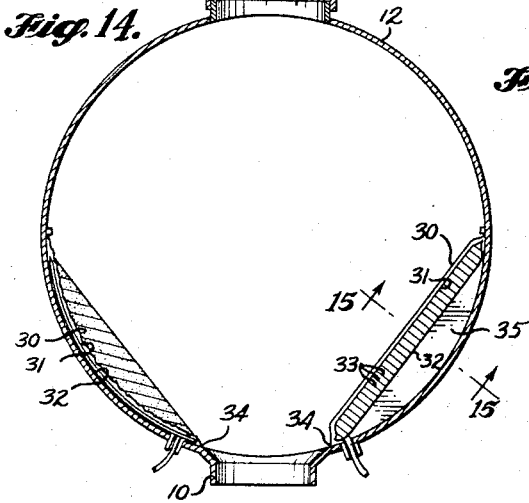
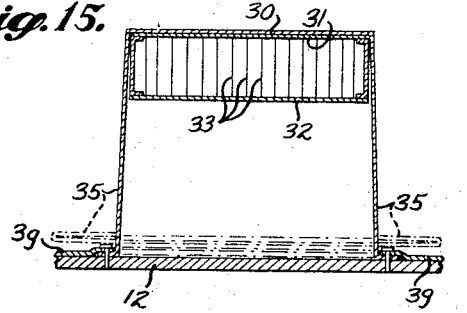
INVENTOR.
HAMILTON NEIL KING PATON
BY
ATTORNEY

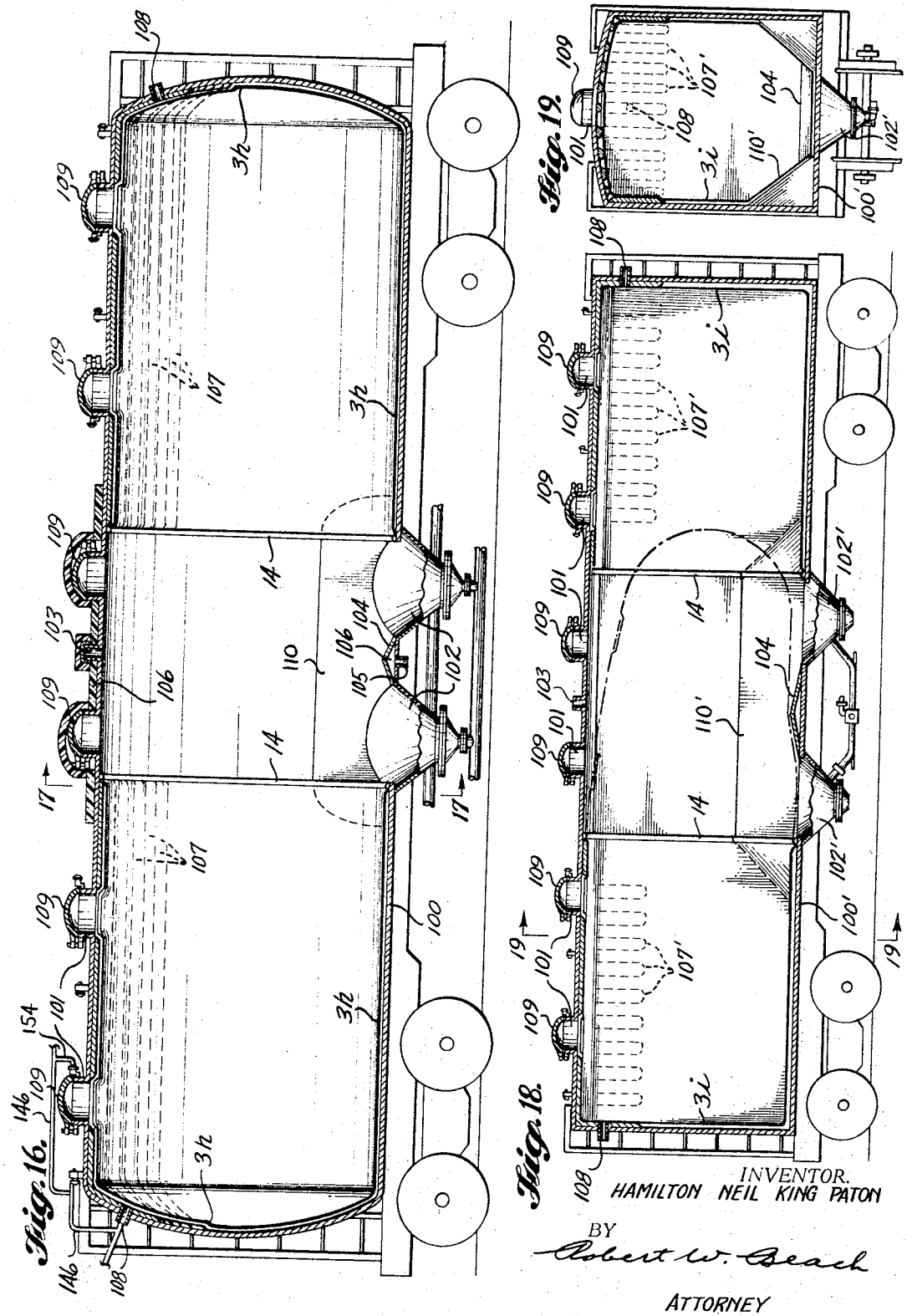

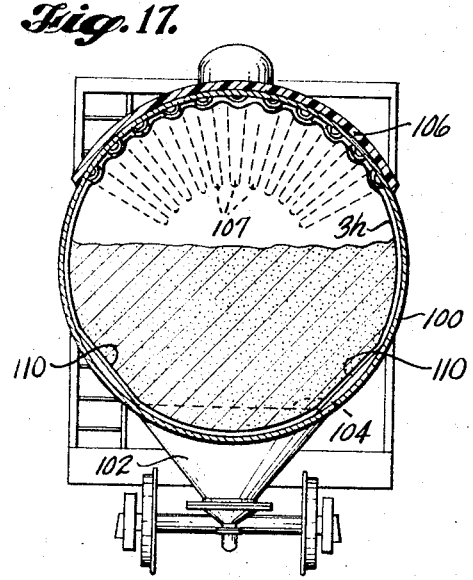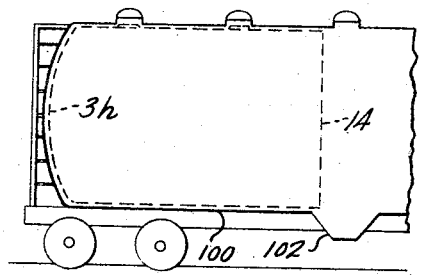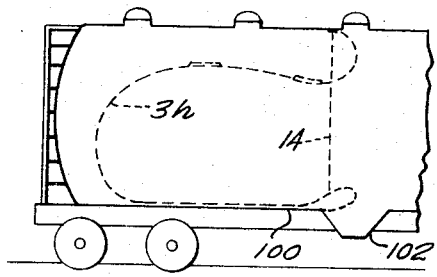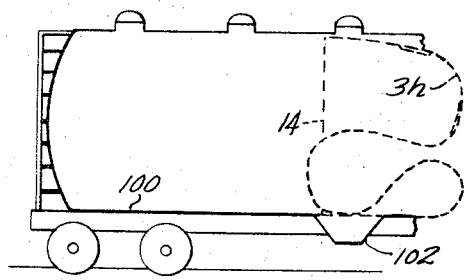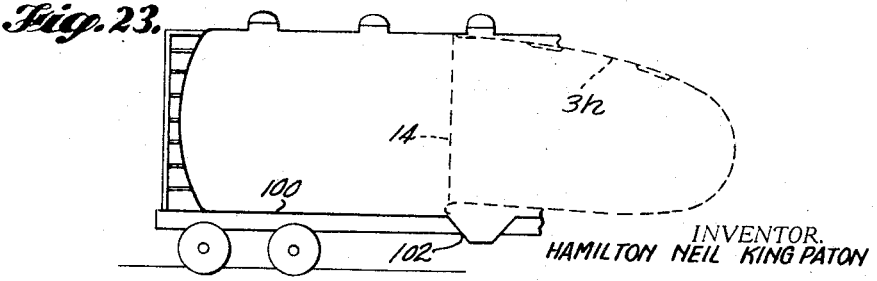
INVENTOR.
HAMILTON NEIL KING PATON

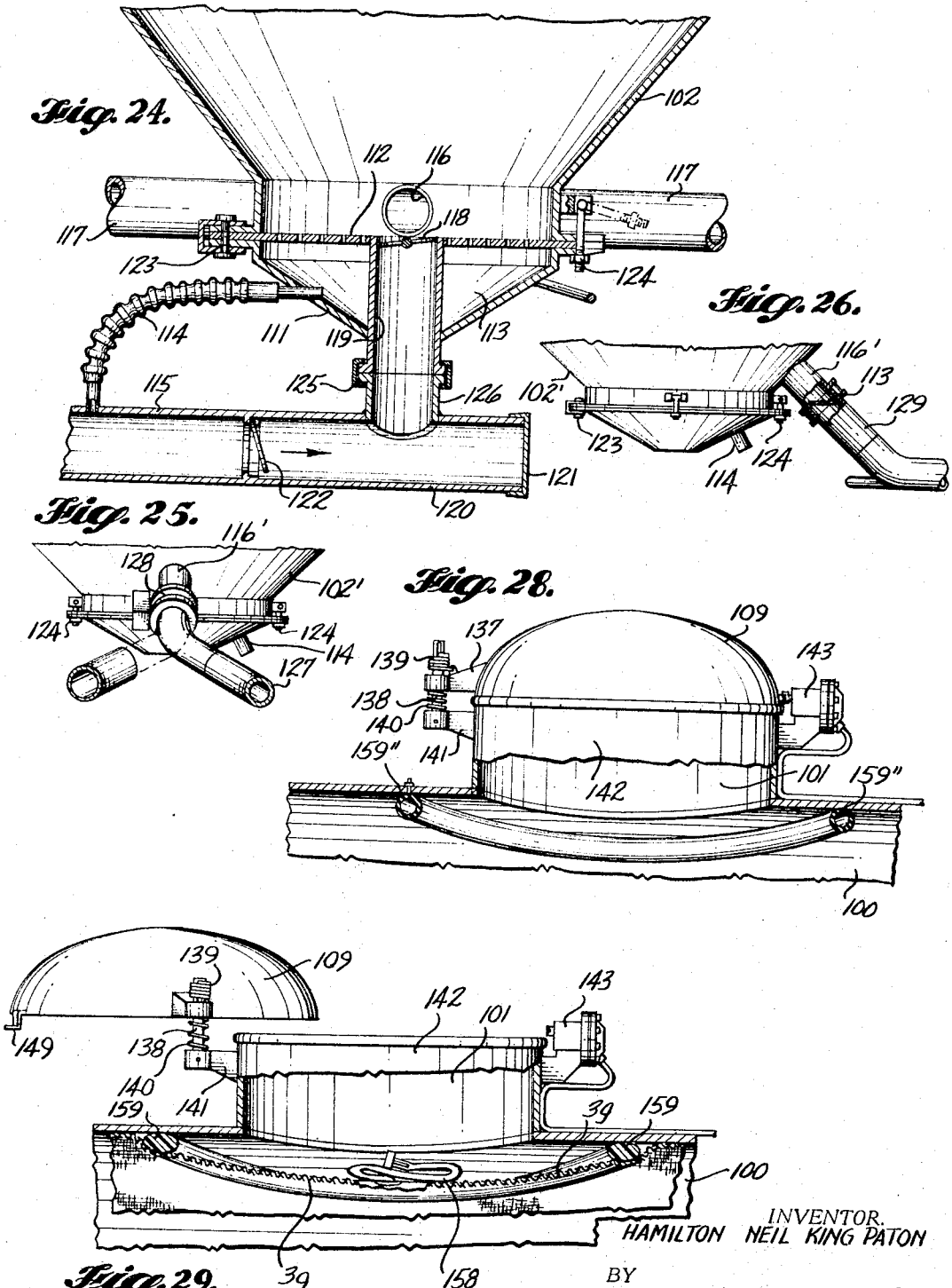

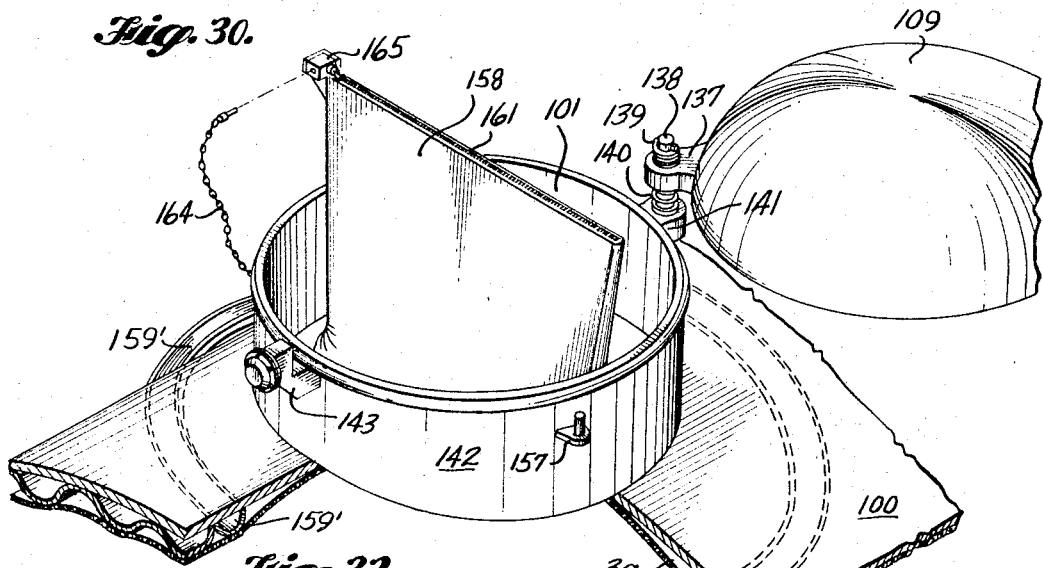
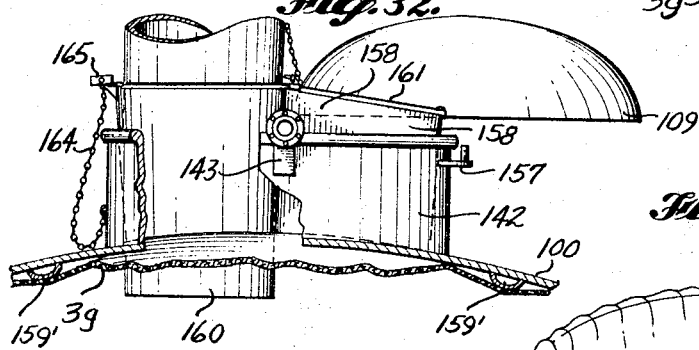
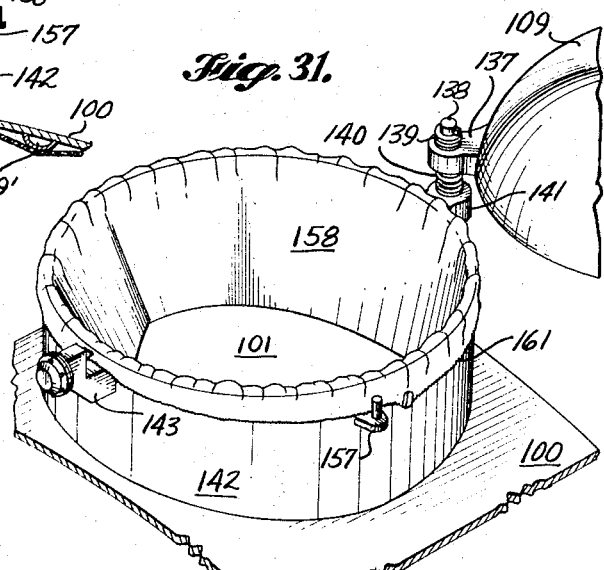
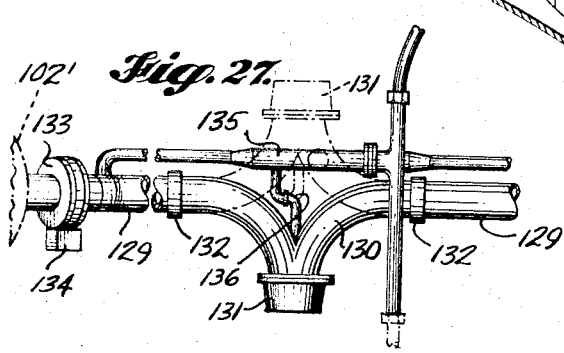

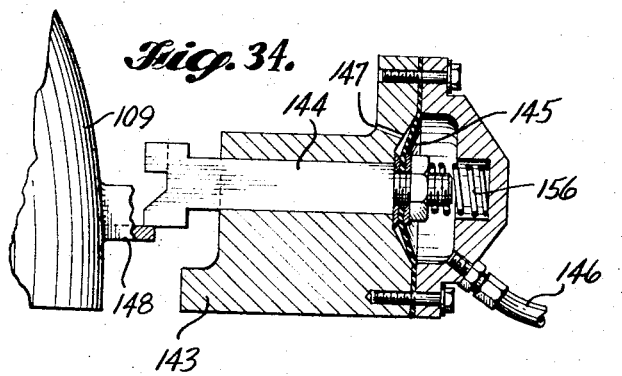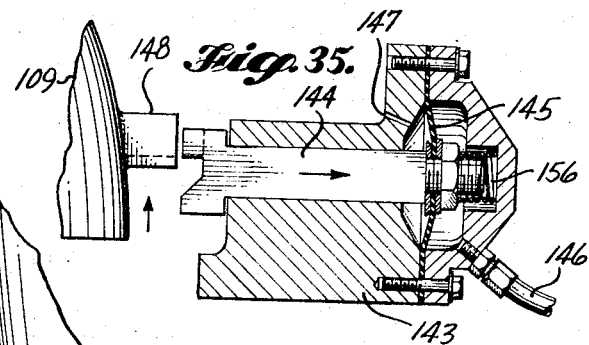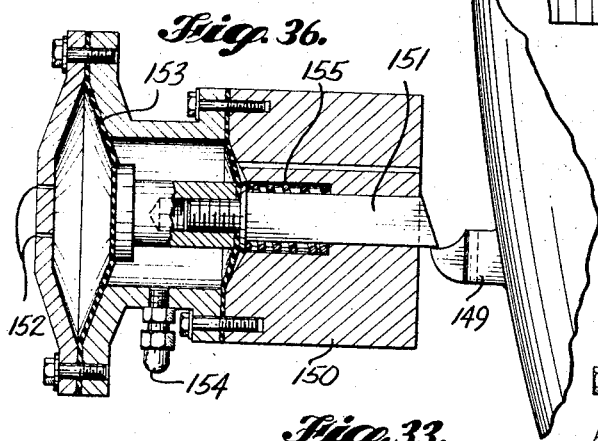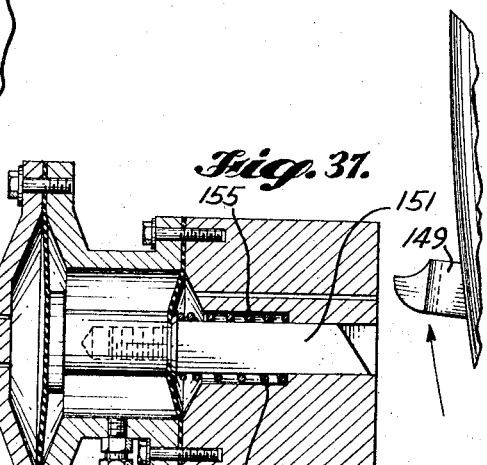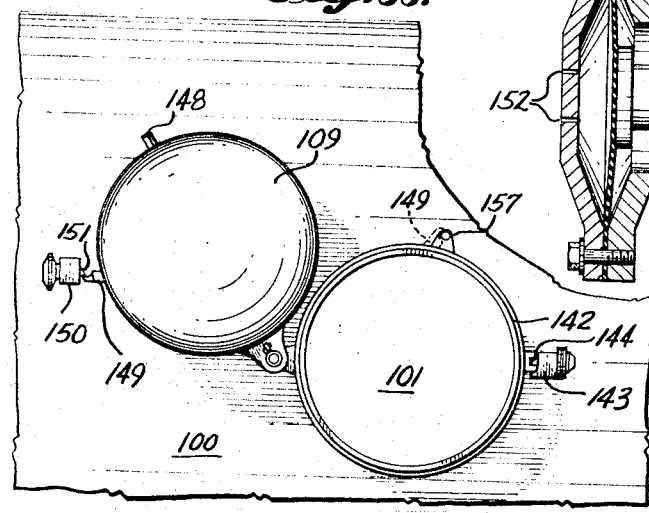

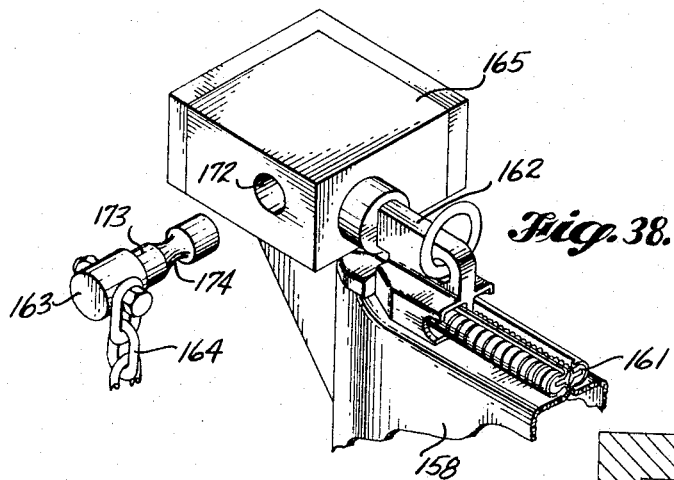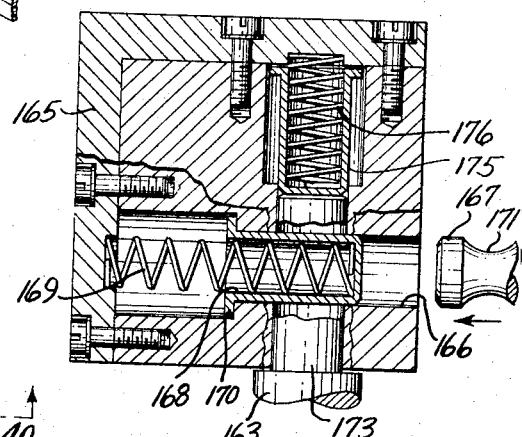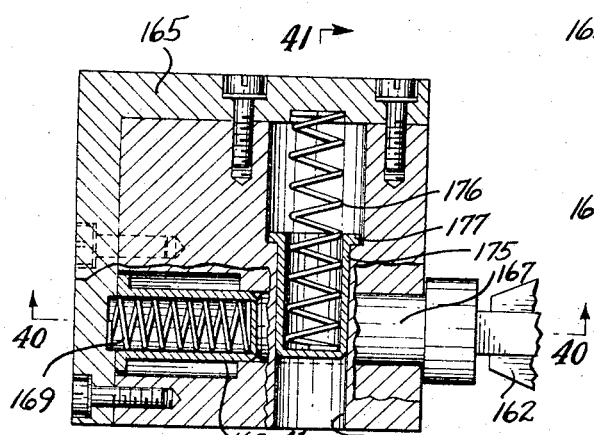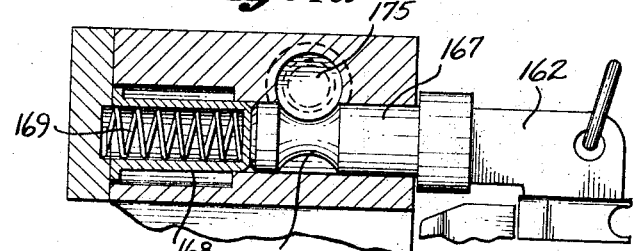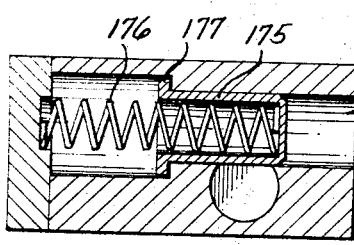

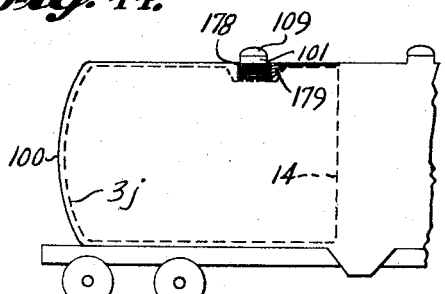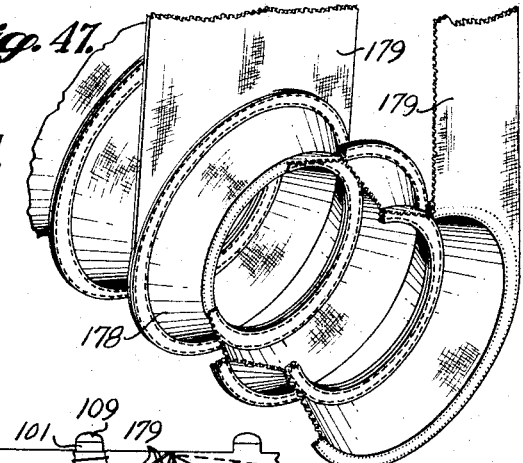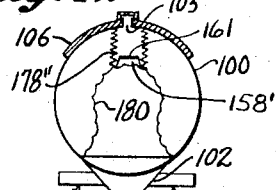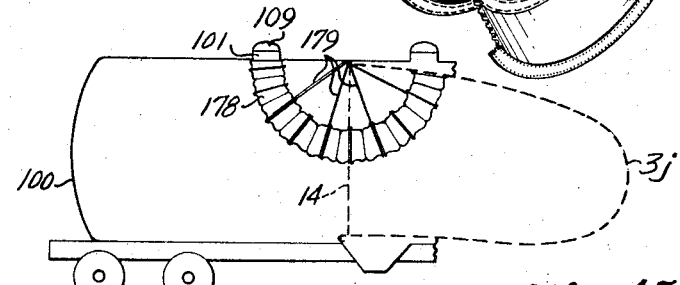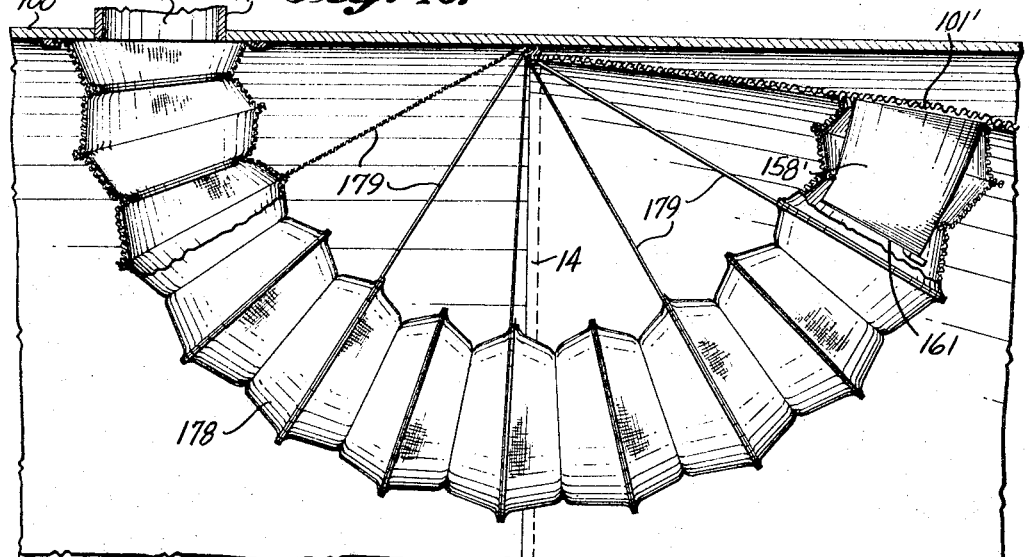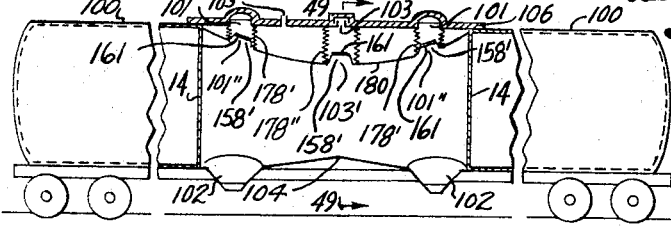

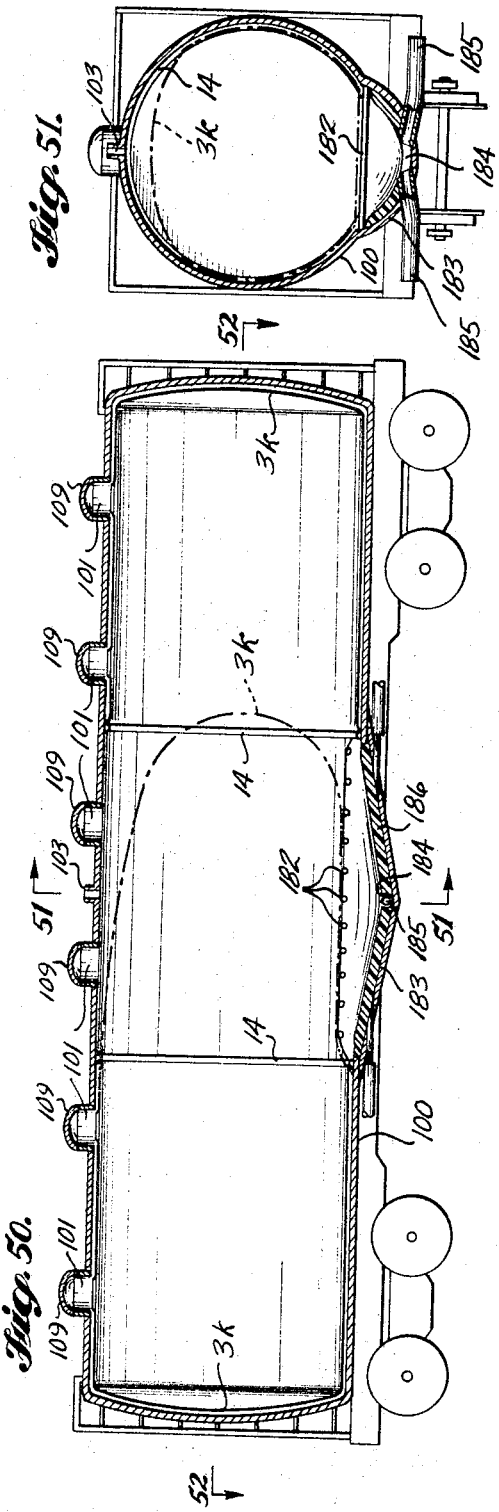

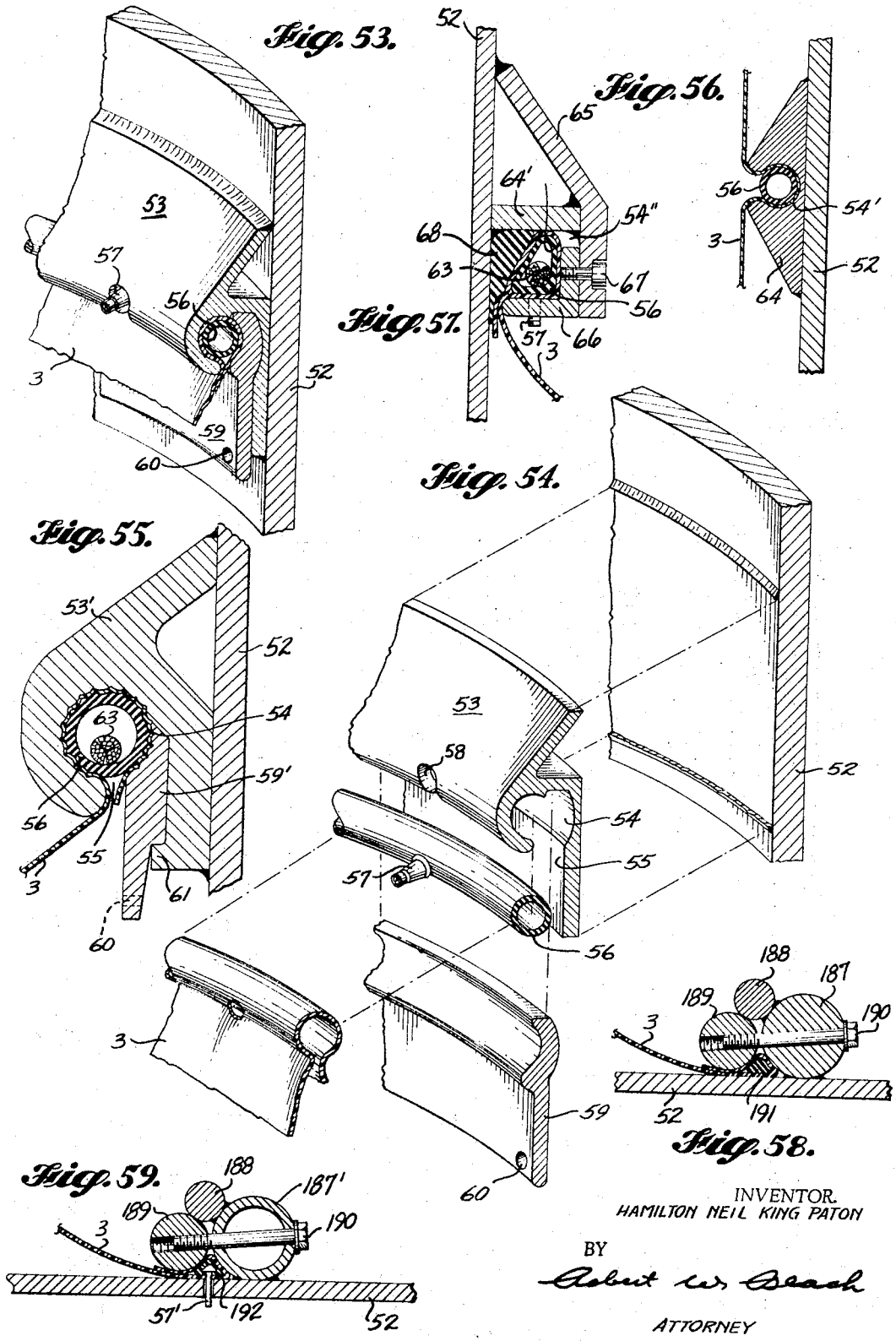

3,351,235
INTERNAL MEMBRANE MECHANISM AND METHOD FOR UNLOADING MATERIAL FROM CONTAINERS
Hamilton Neil King Paton, 4603 118th SE.,
Bellevue, Wash. 98004
Filed Oct. 30, 1964, Ser. No. 408,467
39 Claims. (Cl. 222—1)

This application is a continuation-in-part of my previous application Ser. No. 307,447, filed Sept. 9, 1963, for Container With Internal Membrane.

This invention relates to a method and apparatus for unloading material from containers, and particularly material composed of particles which may be very small, such as in cement or flour, or comparatively large such as in grain or pellets. Such apparatus can also be used for unloading a sludge or slurry which would not drain completely from a container without assistance.

An important object of the present invention is to provide a thin partition membrane in the upper portion of the container between the wall of the container and the material stored in the container, which will serve as an insulating and vapor barrier to deter formation of condensation on the inner wall of a container exposed to the material stored in it, particularly if such wall is of metal, and to protect the material stored in the container from being moistened by such condensation running down or dropping from the container wall. Such membrane also decreases convection and heat conduction between the container wall and discrete particle material within the container. This deters freezing of the contained material when the exterior of the contained is exposed to low temperatures, and deters spoilage of organic between the container wall and discrete particle material being subjected to undesirably high temperatures when the exterior of the container is exposed to high temperature conditions. Such membrane also can be arranged to provide dead air insulating space between it and the container wall to reduce further heat conduction between material in the container and the wall of the container.

A further object is to provide a membrane in a container which can be manipulated to assist in discharging material from the container by pressure of the membrane on such material. Preferably pressure of the membrane on the material is effected by providing a differential fluid pressure on opposite sides of the membrane, the pressure being higher in the space between the membrane and the wall of the container. Such pressure differential can be effected either by reducing the pressure in the material-receiving space within the container below atmospheric pressure or by increasing the pressure between the membrane and the container wall to a pressure above atmospheric pressure, or both. An important object in effecting such differential pressure between opposite sides of the membrane by reducing below atmospheric pressure the pressure at the material-receiving side of the membrane is that the pressure between the membrane and the container wall can be at atmospheric pressure so as not to exert differential pressure on the outer container wall which could crush it.

Another object is to provide the membrane installation in a container having walls capable of withstanding internal pressure in excess of atmospheric pressure so as to enable the pressure between the container wall and the membrane to be increased above atmospheric for insulation, compaction, breaking or discharge of material in the container. Such a container may, for example, be cylindrical with the axis of the container being horizontal or vertical. It will usually be desirable to design the membrane to fit the particular shape of the container, and preferably it will be of a shape complemental to the internal shape of the container wall.

It is also an object to provide a membrane which can be held in wall-lining relationship in the upper portion of a container by differential pressure during loading to permit utilization of the entire internal volume of a container.

It is a particular object to provide an effective continuous seal securing the edge of the membrane to the interior of the outer container wall in a manner to withstand a substantial differential in fluid pressure on opposite sides of the membrane without leakage and without danger of the membrane being detached from the container wall, even though it is subjected to a considerable tension force, and to effect such a seal easily and quickly without penetrating the membrane and without the occurrence of stress-concentration areas.

Another object is to provide a plurality of membranes of cup shape in a rigid container which are of reversible character so that they can turn inside out. In one position such membranes can engage a rigid wall of the container for support. The edge portion of such a membrane can be attached around the container wall in an upright plane.

It is also an object of the present invention to provide a membrane which can be manipulated effectively to expedite initial discharge from a container of discrete particle material, which can be used advantageously to complete substantially the operation of discharging material from a container and which can generally facilitate the operation of discharging discrete particle material from a container. Such manipulation of the membrane can be accomplished most effectively by producing a differential fluid pressure on opposite sides of the membrane and preferably such fluid is air.

The membrane installation of the present invention can be utilized effectively either in stationary or mobile containers and it is an object to utilize for the membrane a material which is impermeable, substantially inelastic and tough, while being highly flexible, wear resistant and economical. At the same time the membrane material should be inert so as not to contaminate material in the container which is edible or which is subject to deterioration or adulteration.

It is an additional object to provide suitable apertures in the container and/or membrane for supply or discharge of fluid or discrete particle material, and to enable such apertures to be sealed easily in fluid-tight condition. In this connection it is an object to prevent a material discharge aperture in the container from being obstructed by the membrane when the opposite sides of the membrane are subjected to differential pressure.

A further particular object is to provide suitable means in the container or on the membrane, or both, to effect a seal between the membrane and the container wall so as to enable the entire volume of the container to be filled with material to be stored which cannot have access to the space between the membrane and the container wall.

It is also an object to exert positive pressure against discrete particle material in a container for the purpose of packing the particles together to increase the bulk density of the material. Similar pressure can also be exerted on agglomerated materials, such as prilled urea, to break them up dynamically for enabling them to be discharged more readily.

A further object is to provide an efficient method for eliminating insect infestation, preferably by use of an inert gas, rather than a toxic gas. By compaction of the material being stored in a container, providing in such material an inert gas and/or surrounding the stored material with an envelope of inert gas the hazard of explosion can be virtually eliminated.

An additional object of the present invention is to provide equipment which will be effective for storing and handling discrete particle materials, whether such material is composed of very fine particles or is composed of coarse particles, or pieces, and to provide discharging mechanism which can readily be adapted to discharge effectively material composed of fine particles or material composed of coarse particles.

The foregoing objects can be accomplished by membrane installations in containers of various types and shapes having either rigid or flexible walls. Protection of the material in a container from being dampened by condensation, and compaction of such material, can be accomplished by providing a membrane which occupies at least a major part of the upper portion of the container. If material is to be removed by suction from a container which is not designed to withstand an internal pressure lower than atmospheric the membrane may be in the form of a liner enclosing a major portion of the material storage space within the container. The attachment of the liner to a flexible or a rigid container can be such as to enable the membrane to follow material in the container as it moves toward an outlet and the differential fluid pressure acting on the liner will press material toward the outlet whether the pressure at the outlet side of the membrane is reduced or the fluid pressure at the side of the membrane opposite the outlet is increased. For this type of operation the liner can be anchored so that the membrane cannot extend over and clog the outlet, or special provision can be made to regulate the progress of movement of the membrane toward the outlet, and further provisions can be made to prevent the membrane from clogging the outlet at any time.

More specifically, an elongated storage chamber has two cup-shaped membranes installed respectively in its opposite end portions which, by differential pressure, can be moved simultaneously toward each other to shift material between them into the space between such membranes, and which pressure of the membranes on the material will have the further effect of compacting and/or breaking up agglomerated stored material. The membranes are spaced apart sufficiently far so that each membrane can be inverted completely, that is, turned inside out for the purpose of moving material toward a discharge opening. Use of a smaller or a larger discharge pipe can be selected, depending upon whether the material stored is composed of fine particles or larger particles. Inert gas can be supplied between the membranes and the wall of the container for the purpose of deterring infestation by insects in such space, and which further will provide an inert atmosphere which cannot support combustion required for an explosion. The possibility of an explosion occurring in the stored material, even though it is very fine, is thus virtually eliminated.

A single cup-shaped membrane could be utilized for the purposes discussed above in a container which is twice the length of the membrane if the discharge opening extends along one half of the container. Where two membranes are used the space between the membranes should be less than the length of either membrane, the container must be at least twice as long as the longest membrane so that it can reverse completely, and the outlet means is located between the membranes and arranged so that either membrane, individually, may cover virtually the entire discharge port means when fully extended in its condition inverted from wall-lining condition.

The edge of the membrane can be connected in fluid-tight relationship to the wall of the container by anchoring the membrane edge in a groove integral with the wall, and securing the membrane edge in such groove by an anchoring strip.

FIGURE 1 is a longitudinal vertical section through a container which may be the body of a railway tank car, and FIGURE 2 is a similar view of a container having a different membrane arrangement. FIGURE 3 is a similar view of a container similar to FIGURE 1 with parts broken away and illustrating membrane movement control mechanism, and FIGURE 4 is a central horizontal section through the container when empty, with parts broken away.

FIGURE 5 is a longitudinal vertical section through a container and membrane structure generally of the type shown in FIGURE 1, but having a different bottom construction. FIGURE 6 is a transverse section through such container and membrane on line 6—6 of FIGURE 5, and FIGURE 7 is a central horizontal longitudinal section through the container and membrane when the container is empty, part of the membrane being broken away.

FIGURE 8 is a vertical longitudinal section through a container generally of the type shown in FIGURE 1, but provided with a different type of membrane bottom construction, and FIGURE 9 is a transverse vertical section through the container taken on line 9—9 of FIGURE 8. FIGURE 10 is a central horizontal longitudinal section through the same container when the container is empty, having parts of the membrane broken away.

FIGURE 11 is a longitudinal vertical section through a container and membrane structure generally like that shown in FIGURE 1 incorporating a type of material-moving structure in its central portion different from that shown in FIGURES 8 and 10, and FIGURE 12 is a vertical transverse section therethrough along line 12—12 of FIGURE 11. FIGURE 13 is a view similar to FIGURE 12 of a modification.

FIGURE 14 is an enlarged vertical transverse section along line 12—12 of FIGURE 11, showing a different construction, and FIGURE 15 is a detail section on line 15—15 of FIGURE 14.

FIGURE 16 is a longitudinal section through a railway tank car including a container generally similar to that shown in FIGURE 1, but having a different type of membrane arrangement, and FIGURE 17 is a transverse section through such railway car taken on line 17—17 of FIGURE 16, showing the container partially loaded.

FIGURE 18 is a longitudinal section through a boxcar type of container and FIGURE 19 is a transverse section taken on line 19—19 of FIGURE 18.

FIGURES 20, 21, 22 and 23 are somewhat diagrammatic side elevations of one end portion of a railway car equipped with a membrane according to the present invention, showing such membrane in various operating positions which it may occupy during a tank unloading operation.

FIGURE 24 is a detail vertical section through a discharge spout of a tank such as shown in FIGURES 16 and 17.

FIGURE 25 is a detail elevation of a portion of an alternative type of tank discharge mechanism.

FIGURE 26 is a detail side elevation of still another form of tank discharge mechanism such as shown in FIGURE 18, and FIGURE 27 is a plan of such mechanism.

FIGURE 28 is a detail side elevation of a loading port for a tank of the type shown in FIGURES 16 and 17, for example, with parts broken away, and FIGURE 29 is a similar view showing parts in a different position.

FIGURE 30 is a top perspective of a loading port installation, with parts broken away, and FIGURE 31 is a similar view showing parts in a different position.

FIGURE 32 is a side elevation of a loading port detail illustrating a different arrangement of parts.

FIGURE 33 is a plan of a loading port installation for a tank such as shown in FIGURE 16, for example.

FIGURE 34 is a section through a latching element for the loading port cover of FIGURE 33, and FIGURE 35 is a similar view showing parts in a different position. FIGURE 36 is a section through another type of latch structure for the loading port cover of FIGURE 33 and FIGURE 37 is a similar view with parts in a different position.

FIGURE 38 is a top perspective of liner membrane closure-locking means; FIGURE 39 is a section through such means showing the parts in one operative position; FIGURE 40 is a section through such means on line 40—40 of FIGURE 39; FIGURE 41 is a transverse section through such means taken perpendicular to FIGURE 40 on line 41—41 of FIGURE 39; and FIGURE 42 is a section through one element of such means on line 42—42 of FIGURE 41; FIGURE 43 is a section through such means similar to FIGURE 39, but showing parts in different positions.

FIGURE 44 is a side elevation of an end portion of a railway tank car similar to that shown in FIGURE 16, having parts broken away and including a special type of inlet port construction, and FIGURE 45 is a similar view with parts shown in a different position. FIGURE 46 is a detail section through the upper portion of the tank showing the special loading port construction in greater detail, with parts broken away, and FIGURE 47 is an enlarged top perspective of a portion of the structure shown in FIGURE 46.

FIGURE 48 is a side elevation of a tank car including a modified membrane installation showing the central portion in section, and FIGURE 49 is a transverse section on line 49—49 of FIGURE 48.

FIGURE 50 is a longitudinal vertical section through a railway tank car generally of the type shown in FIGURE 16 illustrating a different type of outlet construction, and FIGURE 51 is a transverse vertical section taken on line 51—51 of FIGURE 50. FIGURE 52 is a horizontal longitudinal section through the railway car of FIGURE 50.

FIGURE 53 is a top perspective of a fragment of anchoring mechanism for securing the edge portion of a membrane to a rigid wall for use in any of the membrane installations shown in the above figures. FIGURE 54 is an exploded top perspective of the anchor mechanism shown in FIGURE 53.

FIGURES 55, 56, 57, 58 and 59 are transverse sections through different alternative types of membrane edge-securing structure.

The various membrane installations in the containers illustrated in the drawings have three principal functions. The first function is that of constituting a vapor barrier and insulation element in a container. The second function is as a dynamic element for compacting or densifying material composed of fine discrete particles to increase the weight of material which can be accommodated in a given container, and for breaking up agglomerated material. The third function of the membrane installation is to facilitate unloading of discrete particle material or sludges or slurries from a container by exerting controlled pressure on the material for moving it while, at the same time, if desired, protecting the container in which the membrane is installed from being subjected to an internal pressure below atmospheric pressure. These principles can be utilized whether the container is a stationary storage container or a transportation container, such as a tank truck or tank trailer, a railway tank car or a marine vessel.

The membrane installations of the present invention are especially concerned with containers for storing or transporting discrete particle material, which term is intended to embrace any material having reasonable flow characteristics including fine powdered material, such as flour or cement; granular material such as sugar, salt or sand; coarse particle material such as whole grain or corn kernels; chunky material such as pellets, pulp chips, briquets and crushed limestone and small objects such as corn cobs, fruit and vegetables, such as oranges and potatoes, and other materials of irregular shape, as long as particles of the mass are or can be made discrete. All of such products are included within the term discrete particle material because all of them have the characteristics of not being liquid, their particles not adhering into a mass and of forming a reasonably steep angle of repose when piled. It should be understood that the specific items mentioned are only intended as examples to illustrate material having the characteristics pertinent to utilization of the present invention.

A principal application for the present invention is in rail cars, which may take the form of either a tank car, shown in FIGURES 16 and 17, or a boxcar, shown in FIGURES 18 and 19. The tanks shown in FIGURES 1 to 15 may either be stationary, or may be carried on a rail car, a truck or a trailer, a ship or an aeroplane. In each instance the membrane 3g in FIGURE 1 should be of relatively strong and tough very flexible sheet material, which preferably is dimensionally stable.

Such material may be a fabric rendered air impermeable and waterproof, such as urethane-coated Dacron fabric, or the membrane can be of nonwoven material such as polyester resin sheet, available under the trade name Mylar. Such membrane materials are to be understood as merely representative. When such a membrane is interposed between discrete particle material in the container or tank and the tank shell there will be only a very small air space around the liner when the container is loaded. Such air can carry only a small amount of moisture. The membrane barrier prevents the ascension of moisture from the material received in the container into contact with the upper portion of the container wall.

Normally, railway tank cars are made of metal and frequently railway boxcars are metal. If flour, for example, is loaded into such cars and the exterior of their containers is subjected to low temperature, warm moist air will rise from the material in the car into contact with the cold container wall so that such air will be cooled below the dew point and the moisture will therefore be precipitated from it onto the interior of the container wall. As sufficient moisture collects it will form a paste with the flour dust on the wall and may also drip off the container walls as condensate to dampen the surface of the flour. This moist condition promotes mold on the surface of the flour, which is undesirable. Such moisture condition will also produce an undesirable effect on other types of material which may be transported or stored in a container. Provision of the membrane barrier deters the occurrence of such condition because the membrane itself, even where it is in contact with the interior of the container wall, is a poor enough conductor of heat so that usually it will not chill air coming in contact with it sufficiently to precipitate the moisture from the air.

Further, the membrane 3g provides an insulation effect tending to stabilize the temperature of the material in the container, or at least tending to prevent the dew point of the moisture in it from being reached until the product itself has had time to absorb such moisture or reabsorb it without condensation actually occurring. Dead air space formed between the membrane and the rigid container wall increases the insulation effect. The contents of the container will tend to maintain a higher temperature than the atmosphere to which the container is subjected, if such atmospheric temperature is below freezing, so as to afford at least some protection against freezing of the container contents. Conversely, conduction of heat from the exterior of the container through the dead air space and/or the membrane is deterred, so as to decrease damage to the contents of the car which might result from its exterior being subjected to undesirably high temperatures.

In FIGURES 1 to 13, for example, the container 12, and in FIGURES 16 to 19, 44 and 45 and 50 to 52 the container or tank 100, could be used as a stationary inplant storage container, or a land transportation container such as a tank car, a tank truck, a semi-trailer tank, a trailer tank or a boxcar. Because of the elongated character of the container it is desirable for it to have a plurality of filler ports 4 spaced along its length. Each tank shown in FIGURES 1 to 13 has a plurality of discharge ports 10 which may correspond in location to the filler ports lengthwise of the tank. Each of the tanks shown in FIGURES 1 to 13 is divided into a plurality of compartments by fixed rigid transverse partitions 13 located substantially midway between adjacent filler ports and discharge ports. While only one such partition is shown in the tanks of FIGURES 1 to 11, additional partitions could be provided if a longer tank were used or if it were desired to provide shorter compartments within the tank. Such partitions may be perforated to afford fluid intercommunication between the compartments.

In each of the various tank compartments a plurality of flexible membrane partitions are provided which conform to the internal shape of the container so that in one position a membrane section will serve as a liner for a portion of the tank. In each case at least a portion of the liner must be in roof-lining relationship as opposed to only wall-lining relationship. The membrane can be moved to and held up in such lining position, however, only by exerting on the liner a greater fluid pressure on its side away from the container wall than on the wall side. In FIGURES 1 to 13 the tank is shown as being of cylindrical shape and cup-shaped membrane elements are of substantially circular cross section. They are reversible and must be able to turn completely inside out. In each instance membrane sections are located at opposite sides of the circumferential band of the tank where the filler port 4 and the discharge port 10 are.

In FIGURE 1 the cylindrical cup-shaped membrane section fitting each tank end has a curved end or bottom, whereas the ends or bottoms of the membrane sections abutting the fixed partition 13 are planar. Such membrane sections are otherwise of similar shape. The peripheral edges of such membrane sections are suitably secured by fluid-tight joints 14 extending circumferentially of the container adjacent to the filler port 4 and the discharge port 10 in each instance. Each membrane element may then shift its position relative to its edge joint 14 from a position in which it constitutes a liner for one portion of the tank into a fully reversed position where the side of the membrane which was convex when the membrane was a liner has become concave, and the side of the membrane which was concave at the time it functioned as a liner has become convex.

As shown in FIGURE 1, connections or openings through the wall of the container 12 are provided in the wall portions of the container to be engaged by the membrane sections 3g as liners. by connecting a suction source to an opening 7, therefore, the membrane section 3g for the corresponding portion of the container can be pressed by air under higher pressure at the opposite side of the membrane into substantially contiguous engagement with the container wall. In order to supply adequate air under pressure for this purpose it may be necessary to open a loading port 4 or a discharge port 10. When a section of the container is to be filled with discrete particle material both of its openings 7 are connected to a suction source, or such openings are vented and pressure fluid supplied inside the tank section, so that both membrane sections 3g are moved into tank-lining position, as in the right compartment of the tank shown in FIGURE 1. Material may be loaded by blowing it into the storage chamber. If such a pressure differential is not provided the limp membrane material will simply hang from its attach point at the roof and material could easily be loaded on top of folds which would prevent full loading of the container.

With the discharge port 10 closed by a suitable cover and the filler port 4 open the compartment of the tank 12 can then be filled with discrete particle material. Particularly if such material is of the powdered or granular type the filling operation can be interrupted at intervals, especially after the compartment is more than half full, and a source of air under greater than atmospheric pressure can be connected to the openings 7 instead of a suction source or sources while the filler port 4 is vented to atmosphere or a suction source applied to it, or openings 7 may be vented and suction applied at the filler port. The membranes 3g will be pressed away from the container walls by such differential fluid pressure and pressed against the material in the compartment and air will be sucked out from between the particles of the material to pack and densify the material. Such pressure by the opposite membranes will press the material toward the center of the chamber and move it into contact with the walls of the central portion of the container if enough material has been loaded. Such successive packing operations will increase greatly the weight of material which can be received in a container compartment. If only one loading port 7 is provided for each storage chamber it probably will not be possible to fill the compartment completely because of the elongated character of the compartment, but the upper surface of the load may assume a position generally as indicated in the right compartment of the tank shown in FIGURE 1.

Connections 7 through the container wall provide for inert gas under atmospheric pressure, or at a pressure higher than atmospheric, to be supplied to the space or spaces between the membrane and the container wall. If combustible dust material is to be stored in the container, the explosion hazard during loading or unloading can be virtually eliminated by filling the space between the membrane and the container wall with inert gas. Since such space is protected from contamination by dust material, the inert gas expelled or withdrawn from a connection 7 can be compressed or stored for reuse.

Use of inert gas between the membrane and the container wall would also provide a blanket over or around the membrane-covered material of an atmosphere which would not support combustion in case the membrane should be ruptured and would tend to extinguish any fire which might be started on the material side of the membrane. The explosion hazard would thus be greatly reduced. Such hazard can also be reduced where the material is of discrete particle type by keeping it covered closely with a membrane to reduce as far as possible the air content of the space containing the material.

The explosion hazard of combustible powdered material can also be reduced greatly if a minimum of air is mixed with the material, particularly during unloading. Differential pressure can be maintained on a membrane covering the discrete particle material as it is discharged to hold it close to the load, as described above. If the material is withdrawn from the container by suction, simply atmospheric air can be provided at the other side of the membrane; or if the membrane is in a container which can be pressurized, fluid under pressure greater than atmospheric can be supplied to the space between the membrane and the container, which pressure would also be in excess of the pressure at the side of the membrane engaged with the material even if this latter pressure is greater than atmospheric pressure. The membrane would, therefore, follow the material and be maintained in engagement with it as material is discharged from the container. If it is desired to eliminate the explosion hazard completely, inert gas can replace air while loading and unloading.

When discrete particle material of edible character is stored or transported in the container, the inclusion of the membranes enables the material to be protected against infestation by worms or insects or contamination by bacteria. Growth of insects in the space between a membrane member and a wall of the container can be prevented by filling this space with inert gas as suggested above or insecticidal gas, and such gas can also be used to displace air in the material-containing compartment. Such gas could, for example, be nitrogen and carbon dioxide.

For control of infestation by worms or other insects and bacterial growth in the stored material itself, an inert atmosphere could be held in the material-containing compartment at a pressure of one ounce to fifty pounds, depending upon the pressure-resistant character of the container, for a period of at least sixteen hours. The amount of such inert gas, or insecticidal and bactericidal gas, required for this purpose can be minimized if a somewhat greater fluid pressure is applied to the opposite side of the membrane so as to maintain the membrane in close contact with the body of discrete particle material. At the end of this period the inert, insecticidal or bactericidal atmosphere can be removed from the material-containing chamber and replaced by air, but it will still be desirable to maintain the membrane in close contact with the body of material.

When it is desired to unload the container the membrane sections 3g are operable to facilitate and expedite the unloading operation. The action of these membrane sections is illustrated in the left compartment of tank 12, shown in FIGURE 1. While there is no discharge conduit shown connected to the discharge duct 10 in this figure it will be understood that normally such a conduit would be connected to the discharge port. Consequently, a suitable valve arrangement normally would be provided in the discharge port which would be closed while the cover is being removed from the discharge port 10 and the discharge duct is being connected.

When the load is to be discharged from a compartment the valve in the discharge port 10 is opened and usually either suction or compressed air or both is supplied to the discharge conduit, as has been discussed above. Even if a source of suction were connected to the openings 7 to hold the membrane sections 3g in tank wall-lining position, material directly above the discharge port 10 would be discharged through it until the discrete particle material at opposite sides of the discharge port has reached a natural angle of repose. The problem is then to move the body of material of generally rectangular cross section, as shown in the right end of the left compartment in FIGURE 1, into a position to drop through the discharge port 10.

When a tank compartment such as shown at the right of FIGURE 1, or a container, equipped with elements 3g, is to be unloaded, air, preferably under pressure, is supplied to one of the openings 7. Unless suction is applied to the discharge port 10, such air must be under pressure. Even if air pressure is supplied within the membranes to force the stored material out, the higher fluid pressure acting on the side of the membrane section 3g opposite the discharge port will press the membrane in the corresponding end compartment down against the material and then toward the outlet 10. As shown in the left end of the left compartment of FIGURE 1, the pressure behind the left membrane section will urge it into a reverse curve shape, so as to roll the upper part of the pile of material in the left end of the container compartment toward a position above the discharge port 10. It should be noted particularly that it is not necessary for the material to be lifted by such reverse curve rolling of the membrane section, but such section shifts the upper portion of the body of the material principally laterally. As material continues to be urged toward a position over the discharge port 10 the upper portion of the membrane element is peeled inwardly from the wall of the container, as indicated at the left of FIGURE 1. Although the weight of the material tends to hold the lower portion of the membrane element down while the upper portion of the element continues to bulge progressively farther to the right, special means must be provided additionally to accomplish total discharge because of the tendency of the membrane bottom to roll out over the outlet.

Such fluid pressure differential can continue to be applied beneficially to the membrane until enough of the contents in such end of the compartment has been discharged so that a considerable portion of the membrane will bear against the standing face of the material in the opposite end of the compartment, as shown by line A in FIGURE 1. Air, again preferably under pressure, will then be supplied to the connection 7 of the other compartment end, while reducing the fluid pressure between the container wall and the first membrane section to a value below the pressure within the container. A suction source at a pressure lower than any suction applied to the discharge port 10 can be connected to the first opening 7, or such first opening can be vented if the tank interior is pressurized. Consequently, the first membrane section, at the left of FIGURE 1, will be pressed back again into a container lining position such as shown in the right end of the left compartment in FIGURE 1.

When differential fluid pressure is thus applied to the right membrane section 3g, its upper portion in turn is urged toward the central portion of the left container compartment in FIGURE 1 and moves material to a position over the discharge port 10 until eventually it assumes a position fully to the left of its edge connection to the container when all of the material has been moved out of the right end of the left compartment. The right opening 7 is then subjected to a pressure lower than that within the central portion of the container compartment so that the latter pressure will press the right membrane element 3g to the right back again into lining relationship to the tank wall. Air, preferably under pressure, is then again supplied to the opening 7 communicating with the left end of the left compartment in FIGURE 1 so that the left membrane section will again be urged to the right away from its container-lining position in a reverse curve shape as shown in FIGURE 1. By this action the upper portion of the body of material in the left end of the container compartment at the left of partition 13 will be rolled to the right into a position above the discharge port. The left membrane section will bulge progressively farther to the right, beyond the position A, because the right end of the compartment is empty, and be peeled progressively from the left end of the container compartment until this membrane section has moved through position B and has reversed completely or been turned inside out in position C.

While theoretically such second manipulation of the left membrane section in the container formed by the left compartment of the tank 12 in FIGURE 1 will have moved all the material in the left end of the container into the discharge outlet, actually the lower portion of this liner may have rolled in return bent shape across the outlet as indicated at 15 in FIGURE 1, so that some of such material will have been transferred onto the lower portion of the right membrane section 3g. When the left membrane has been reversed completely, therefore, it will be desirable to connect a suction source to the opening 7 communicating with the left end of the left compartment in FIGURE 1 and vent the container, or pressurize the container and vent left opening 7, so as to effect movement of the left liner membrane section 3g back into container-lining position. A source of air under low pressure is then connected to the right opening 7, so that the right membrane section will move gently through the reverse curve shape like that shown in FIGURE 1 into completely reversed position. This further manipulation of the right membrane section may empty completely the left compartment of the tank, but some material may be transferred back onto the left membrane section and can be cleaned out manually.

The right compartment of the tank 12 shown in FIGURE 1 can be emptied in the same manner as the left compartment. When both compartments have been emptied suction sources can be connected to the openings 7 to return the membrane sections to their container-lining positions. The valve in each discharge port 10 can then be closed and a cover applied to it preparatory to the tank being filled again.

While the membrane sections 3g of FIGURE 1 are shown as having edge portions lying in a plane perpendicular to the axis of the tank and of such cup-shaped elements, it is not necessary that the membrane edge be located in such a plane. Thus, in FIGURE 2 the circumferential edges of the cup-shaped membrane elements 3h are shown as being disposed in planes inclined relative to the axis of the tank and the cup-shaped membrane elements. Such membrane edge plane is shown as being inclined upward away from the discharge port 10 in the bottom of the container, but the inclination of such plane to vertical must not exceed about 10°. Otherwise, in turning inside out, the membrane will roll forward and upward toward the roof and material will be trapped by the membrane instead of being discharged through the outlet. However, the edge of each membrane section could be disposed in a plane inclined in the opposite direction so that the upper portion of the membrane section in each instance would be located close to a filler port 4, while the lower portion of the membrane edge would be spaced a substantial distance farther from such port and port 10 would be elongated accordingly. The function and operation of the membrane section would be in general the same as described in connection with the membrane section 3g of FIGURE 1.

In some instances it may be found that when air under pressure is supplied to a connection 7 communicating with the space between a wall of the container 12 and a membrane section 3g, a portion of the membrane nearer the discharge port 10 may tend to move away from the container wall lower portion before a portion farther from such port moves away from the lower portion of the container because of the fluid pressure beneath the membrane and the fact that the angle of repose of the material face slopes to this point and therefore the least weight is applied to the membrane as such point. Thus the lower portion of the membrane may assume a reverse curve shape, as indicated by line A in FIGURE 1, forming a pocket next to the discharge port in which discrete particle material is trapped. As the membrane is moved from position A to position B, its lower portion will tend to roll across the discharge port and obstruct it while such portion carries a quantity of discrete particle material into the opposite end of the compartment. Reversing the fluid pressure on each membrane section alternately will simply result in approximately the same amount of material being again carried back into the compartment end opposite the membrane which is turned inside out.

To deter such rolling of the lower membrane portion across the discharge port, ribs 16 are shown in FIGURE 3 on the container bottom, at least at one side of the discharge port, forming grooves between them into which the lower portion of the membrane will sag. Also, parallel longitudinal ribs 17 extend lengthwise of the container and are spaced transversely of it to connect the ends of ribs 16, as shown in FIGURE 4, so the ribs form a row of pockets. A suction source connection 18 to each pocket produces suction on the membrane exceeding any suction applied to the discharge port. Thus a fluid pressure differential is exerted on the lower portion of the membrane section 3g opposite that on the upper membrane portion which presses it away from the upper portion of the container. The degree of suction applied to connections 18 beginning farther from the discharge port 10 can be reduced or discontinued progressively so that the membrane can be peeled progressively toward the discharge outlet.

Instead of the elements formed by ribs 16 and 17 in FIGURES 3 and 4 being suction pockets, they can be electromagnetic units magnetizable to attract magnetic elements incorporated in the lower portion of the membrane section 3g. The magnetic attraction on the membrane magnetic elements will hold the lower portion of the membrane in contact with the container bottom. Such magnetizable elements can be deenergized sequentially beginning with the units farthest from the discharge port to enable the lower portion of the membrane to be peeled toward the discharge port.

FIGURES 5 to 10 show other expedients for insuring that the lower portion of the membrane will be peeled progressively from the container bottom, instead of rolling toward the discharge port 10 and forming a return bend 15 as shown in line B of FIGURE 1. The lower portion of the membrane, at least at one side of the discharge port, can be stiffened temporarily at will in controllable fashion by providing in it inflatable pockets adjacent to the discharge port. These are connected to a source of fluid, preferably air, under pressure to inflate and thus rigidify the membrane.

In FIGURES 5, 6 and 7 the pockets 19 are elongated circumferentially of the membrane element, as shown best in FIGURES 6 and 7, and are disposed in edge-to-edge relationship, as shown best in FIGURES 5 and 7. Fluid under pressure is supplied to these pockets through connections 20 and such pockets may be interconnected so that air flows from one pocket into the next pocket to effect simultaneous inflation of all of such pockets, or the pockets may be inflated separately. In any case deflation of the pockets can be effected or controlled sequentially so that the compartments are deflated in succession starting with those farthest from the outlet, as shown at the right of FIGURE 5.

In FIGURES 8, 9 and 10 the pockets 21 in the lower portion of the membrane element 3g are elongated longitudinally of the container. Each pocket is therefore straight and the row of pockets in side-by-side relationship is of arcuate shape. Fluid under pressure is supplied to these pockets by a connection 22 and the pockets of the series are in communication with each other so that all of the pockets are inflated at the same time to provide a rigid inflated section. The pockets are preferably tapered in thickness away from the discharge port 10, as shown in FIGURE 8, and each pocket may be tapered in width from the discharge port. Such tapering facilitates curling of the pocket group beginning at the end farthest from the discharge port when such pockets are partially deflated. Alternatively, these pockets, or the transverse pockets of FIGURES 5, 6 and 7, when loosely filled with beads of metal, glass or plastic, as shown in FIGURE 9, can be rigidified by partial evacuation and their flexibility restored by bleeding air into them again.

It will be noted that the portion of the bottom of the membrane section 3g which is rigidified by inflation of a row of pockets need not be very extensive, its function being simply to prevent the membrane lower portion from starting to roll into a return bend over the discharge outlet 10, instead of being peeled progressively from the container wall. Instead of the inflatable pockets being elongated simply lengthwise of the membrane section, as shown in FIGURES 8, 9 and 10, or circumferentially of the membrane section, as shown in FIGURES 5, 6 and 7, a double layer of inflatable pocket rows can be provided in crossed relationship, the pockets in one row being elongated lengthwise of the container and the pockets in an overlying row being elongated circumferentially of the container. Whichever type of rigidifying inflatable pocket area is provided such portion of the membrane element can simply be deflated in a controlled manner progressively toward the discharge port 10 near the end of the material-discharging operation to enable the bottom portion of the membrane to be peeled progressively from the container bottom without rolling into a return band shape.

By use of the various forms of membrane installation described material in a container can be moved into the space between the joints 14 securing the edges of adjacent membrane sections to a rigid container. Most of the material thus moved into registry with the discharge port lengthwise of a horizontally elongated container will be discharged readily through such port. Where the container is of cylindrical cross section, however, and the discharge port 10 has only a small extent circumferentially of the container, it would be possible for some material to lodge between the joints 14 and circumferentially adjacent to the discharge port without passing through it.

Flow of material from between the membrane joints 14 through even the small outlet 10 can be insured by installing between such joints rigid arcuate panels 24' of porous material, as shown in FIGURES 8, 9 and 10, through which air can be supplied to loosen particle material for movement over such panels. Such porous material panels 24' preferably are of porous polyethylene. Air can be supplied under pressure to such panels through connections 23" to air distribution ducts 23' which can be located either externally of the container, as shown in FIGURE 9, or within the container.

By using means additional to the cup-shaped membrane elements, such as a displaceable liner as shown in FIGURES 11 and 12, or FIGURE 13, or FIGURES 14 and 15, it is also possible to insure discharge of discrete particle material completely from the portion of the container between the membrane joints 14 without enlarging the discharge port. Each of these expedients includes material-dumping structure located in the same circumferential zone of the cylindrical tank 12 as the discharge port 10, which structure is arranged to bridge the lower arcuate portions of the container at opposite sides of the discharge port for the purpose of changing the effective shape of such portions of the container wall generally to arcuate curves of greatly increased radius or to chords of such arcuate portions of the container.

In FIGURES 11 and 12 the additional displaceable lines are bands of interconnected inflatable pockets 25 provided at opposite sides of the discharge port 10. The lower end of each band is secured by a joint 26 to the container wall adjacent to the discharge port and the upper end of the band in each instance is secured to the container wall by a joint 27. When the pockets are deflated the band is of a length to line the container wall between the joints 26 and 27, as shown at the right of FIGURE 12. Inflation of the pockets 25 by fluid under pressure supplied to the connection 28 will cause the side walls of the pockets to bulge so that the row of pockets is shortened sufficiently to increase greatly the radius of curvature of the row of pockets or even to arrange them in a linear chord of the container, as shown at the left of FIGURE 12. Thus, when the pockets have been inflated the inclination of the band will be sufficiently steep despite the grooves between the pockets so that the material cannot remain alongside the discharge port, but will be expelled through the port. Membranes 29 can be flexibly secured between the edges of the band formed by the row of pockets and the container wall to prevent material from lodging behind the inflatable pocket band.

The construction shown in FIGURE 13 includes an upper inflatable pocket 25 having its axis extending lengthwise of the container, like the pockets 25 of FIGURES 11 and 12, but between this pocket and the discharge port 10 are connected a plurality of pockets 25' in side-by-side relationship having their axes extending generally chordwise of the container. Such pockets 25' may taper in thickness toward opposite ends from generally their central portion, bulging of the walls being restricted by internal webs, if desired. When the pockets 25 and the pockets 25' are inflated simultaneously, preferably by air under pressure, as shown at the left of FIGURE 13, inflation of the pockets 25 will shorten the extent of the assembly between the location of attachment to the side wall of the container and the attachment adjacent to discharge port 10. Also, inflation of pockets 25' will move the inflatable assembly toward a chordal position. The curvature of the upper pocket will assist initiation of movement of material lengthwise of the pockets 25'.

In FIGURES 14 and 15 the displaceable liner band 30 is similarly arranged in the circumferential zone containing the discharge port 10. This band also is of the inflatable type but instead of being formed as a row of pockets this band includes two surface sheets 31 and 32, as shown in FIGURE 15, which are interconnected by threads 33 of equal length, so that when fluid under pressure is supplied between the sheets 31 and 32 such sheets will move apart to the limit permitted by the lengths of the threads 33 and the strip will become rigid. In this instance, however, the length of the strip will not be altered appreciably, so that as the strip moves from the deflated condition at the left of FIGURE 14 to the inflated condition at the right of that figure, the curved length of the strip in deflated condition will be substantially equal to the length of the straight strip in inflated condition. The upper or lower edge of each strip is anchored by a flexible joint 34 to the container wall and the opposite edge of such strip must be secured to the wall by means capable of moving along the wall away from the anchored edge as the strip is inflated. Membrane panels 35 extending between the inflatable strip 30 and the wall of the container close the space between the strip and the container wall in all positions of the inflatable strip so as to prevent the accumulation of material from the load in the space between the strip and the container wall.

The structures shown in FIGURES 11 to 15 have been illustrated as being arranged to move discrete particle material from the lower quadrants of a cylindrical container toward the center of the container over a short distance lengthwise of the container in each instance, but it will be understood that the same type of structure could be extended to any length along the container for the purpose of moving material toward the central portion of the container. Thus, for example, the discharge port 10 could be elongated lengthwise of the container, to any extent desired, as a slot through which movement of the inflatable chordal elements could effect discharge of material. Alternatively, such elements could dump material onto conveying means extending lengthwise of the container such as a trough containing a screw conveyor or an endless belt or flight conveyor, or a mechanical or fluid vibratory or pulsating surface. Dumping of material into the central portion of the container can be facilitated by pulsating the air which inflates such chordal members. Also, such chordal members could be located behind membranes, if desired, which in the forms of device shown in FIGURES 12 and 13 would provide a smooth outer surface.

In FIGURES 16 and 17 a railway tank car having somewhat different features is shown. In this instance the tank 100 has a plurality of loading ports 101 located at spaced intervals along its top. The material is unloaded from the tank through discharge hoppers 102, of which there are preferably two, located in the central portion of the tank between the membrane attachment lines 14. It is necessary to provide a discharge opening of adequate size through which to move the discrete particle material quickly. If a larger opening is desired it is usually not practical simply to enlarge a single discharge opening because the size of the hopper cone cuts too far into the side wall of the tank. On the other hand, if the tank is to be pressurized, it is not feasible simply to elongate the discharge opening lengthwise of the tank to expedite discharge of the material and to assist in conveying it away from the tank, because such a slot would decrease the circumferential strength of the tank too greatly. It is possible, however, to obtain a sufficiently great area of discharge opening by providing two, or even three, circular openings spaced lengthwise of the tank. A vent opening 103 is located in the top of the tank preferably at approximately the center.

In the particular tank shown in FIGURES 16 and 17 six loading ports are shown, two of which are located between the membrane attachment lines 14, two more of such ports at the top of that portion of the tank which can be lined by one membrane 3h in one end portion of the tank, and two other ports at the top of the other end portion of the tank which can be occupied by another membrane. The purpose of providing a larger number of membrane attachment lines than illustrated in the tanks of FIGURES 1 to 11, is to expedite loading of the car by enabling material to be fed into more than one or all of such loading ports simultaneously and to enable the material to be distributed more uniformly along the length of the car as the tank approaches the filled condition and thus utilize fully the interior of the container.

In the type of construction shown in FIGURES 16 and 17 the tank has no central partition and the length of each cup-shaped membrane 3h is greater in proportion to its diameter than is the case in the tank sections of FIGURES 1 to 11. Use of the two discharge hoppers 102 deters plugging of the outlet by the membranes during an unloading operation. Material can be dislodged from the space between the hoppers by a bridge 104 preferably inclined downward toward the two hoppers. Flow of material from such bridge into each of the hoppers can be expedited by supplying air under pressure through a connection 105 to the cavity 106 beneath the bridge and perforating the bridge so that air can escape through it to loosen particulate material above the bridge, and/or the bridge can be connected resiliently to the adjacent portions of the tank and provision made for vibrating the bridge to loosen material for flow from it into the hoppers. In some cases it is preferable to supply little or no air to the material because of the hydroscopic nature of the particular product, such as sugar, salt and urea. Such air as may be used can be refrigerated to reduce its moisture content.

While each of the membranes 3h being of nonmetallic fabric material affords some insulation between the contents of the tank and the tank wall, which usually is of metal, it may be desirable to increase the amount of insulation between the membrane and the tank wall, particularly around its upper portion. At the central portion of the tank between the membrane attachment lines 14 a layer of insulation 106 can be provided extending over approximately the upper quadrant of the tank. It is not necessary for the insulation to extend farther down around the sides than this, because warm moist air, which produces internal condensation, rises from the material in the tank into the dead air space only above the load and in addition the material is in contact with the bottom and lower portions of the tank wall, thus acting to prevent condensation.

It is not necessary to have a complete layer of insulation above the end portions of the tank capable of being occupied by the membranes 3h if provision is made for spacing such membranes from the metal tank wall to provide air space by pressing the membranes down onto the load during storage. However, during slow loading under very low temperature conditions it may be desirable to provide additional insulation in the form of ribs 107 between the membranes proper and the tank wall proper to prevent condensation occurring inside the membranes, particularly if it should be necessary to interrupt such loading operation for a substantial period of time. These ribs preferably are parallel but may extend either longitudinally of the tank, as shown in FIGURE 16, and then radially toward its center over the upper portions of the tank end walls, as shown in FIGURES 16 and 17, or such ribs may extend circumferentially of the tank or even in some other direction. Also, such ribs preferably are secured to or integral with the tank wall but, if desired, they could be mounted on the outer side of the membranes 3h.

Such ribs 107 should be made of insulating material such as rigid or semirigid foam plastic, or the ribs may be of the inflatable type. Any suitable means could be provided in the latter case to effect pneumatic inflation, or even hydraulic inflation, of such ribs. In any event, the liner 3h will be held by such ribs in spaced relationship to the tank wall 100, so as to increase the insulating value of the membrane alone and further deter condensation. If such ribs are mounted on the membrane, rather than on the tank wall, it is preferable for them to be of the inflatable type. Inflatable ribs can be deflated when filling of the tank has been almost completed to increase the capacity of the container.

The operation of the membranes 3h is generally the same as described in connection with the earlier figures. When it is desired to load the tank a suction source is connected to each of the pipes 108, which extends through the shell of the tank 100, to communicate with the space between the shell and a membrane 3h. Only a very small suction is required for this purpose, such as one-half a pound per square inch, or even less. At the same time the vent 103 is open to supply air under atmospheric pressure to the interiors of the membranes. Such atmospheric pressure exerted on the membrane interiors will press the membranes away from their attachment lines 14 into the tank wall-lining relationship shown in FIGURE 16. Alternatively, the connections 108 can simply be vented and a source of air under a small pressure can be connected to the pipe 103 to provide a differential in pressure on opposite sides of the membranes. This latter method of providing a pressure differential on opposite sides of the membranes is, however, less desirable during the tank loading operation. In either case the groove between two adjacent ribs 107 would afford a channel for flow of air between the connection 108 and all parts of the space between the membrane and the wall lengthwise of the membrane and container, or equivalent flow channel provision should be made.

While the membranes are being held in the wall-lining positions shown in FIGURE 16, particulate material can be loaded into the space within the membranes through one or more of the loading ports 101. When the loading has been completed the covers 109 are closed and secured, but the interior of the tank may continue to be vented through the vent opening 103, or such opening can be closed after suction has been applied to draw the membrane down into close contact with the stored material, as discussed previously. The material is then thus stored or transported until it is ready to be discharged from the tank.

While FIGURES 16 and 17 show the membranes 3h installed in a tank of cylindrical cross section such membranes can be utilized in a tank of a different shape, such as the tank 100' shown in FIGURES 18 and 19, which has a cross section of substantially rectangular shape. This tank is shown as serving as the body of a railway boxcar. In this instance the membranes 3i are also of substantially rectangular cross section, corresponding in shape to the interior of the tank 100', so that when suction is applied to the connections 108 and the vent 103 is open the membranes will be drawn into lining relationship to the interior of the tank, as shown in FIGURES 18 and 19.

In the tank 100' of rectangular cross section ribs 107' are provided which extend across the roof of the tank transversely of its length and part way down the side walls. These ribs constitute means for spacing the membrane away from the inner wall of the tank to avoid contiguous contact with it, which would tend to promote condensation, as discussed in connection with the ribs 107 of FIGURES 16 and 17. These ribs also may be of solid material which is preferably of insulating character and at least somewhat resilient, or such ribs can be inflatable. Moreover, these ribs again can be integral with or secured to the inner wall of the container, or can be carried by the membrane. Particularly in the latter instance the ribs should be of the inflatable type.

To expedite loading, a plurality of loading ports 101 are provided in the top of the tank shown in FIGURES 18 and 19, and unloading of such tank can be accomplished through two or more central discharge hoppers 102'. The structure of the loading ports 101, their covers 109 and the discharge hoppers 102' and related mechanism may be essentially the same as the corresponding elements embodied in the tank construction illustrated in FIGURES 16 and 17. This structure is described in greater detail below.

The functions of the membranes 3h of FIGURES 16 and 17, and 3i of FIGURES 18 and 19, are generally the same. When the tank is being filled with material the cup-shaped membranes must be held in substantially contiguous engagement with the inner wall of those portions of the tank with which such membranes are in registry, as illustrated generally in FIGURE 20. In this position the membranes can accommodate the greatest possible quantity of material in the tank. When the tank has been filled initially, the filling openings can be closed, and a small amount of differential pressure, such as one pound per square inch, applied to the membranes by a suction source connected to port 103 in FIGURES 16 and 18 while having the connections 108 open to atmosphere or, in the case of FIGURE 16, while supplying pressurized gas to the two connections 108. The differential pressure of the gas will force the two membranes toward the center to compact the loaded material.

After the material in the tank has thus been compacted suction sources may again be connected to the ducts 108 and the central section vented to move the membranes into tank wall-lining condition, and the loading ports 101 can be reopened and more material loaded through them. The loading operation can be stopped several times during the last portion of the operation and in each instance the loading ports can be closed and differential fluid pressure applied to the membranes to press them inward. The material in the tank may thus be subjected periodically to a compaction force which, in the case of lightweight compactable material, such as diatomaceous earth, will increase the specific gravity of the mass considerably and allow much more of such material to be loaded into the tank than would otherwise be possible. When the tank has been filled to as great an extent as desired the loading ports can be closed, and suction can be applied to connection 103 to move the membranes into firm engagement with the loaded material, connections 108 being vented to atmosphere, or, in the case of FIGURE 16, gas under pressure higher than atmospheric pressure can be supplied to the connections 108. The connections 108 and 103 can then be closed by suitable valve means so that differential pressure will remain in the tank applied to the membranes to maintain continuing engagement with the material in the tank until it is desired to unload it.

When the tank portion within the membranes has been filled as full as possible exertion of pressure on the two end membranes to crowd the material toward the central portion of the tank to fill it completely can be effected by supplying to the connections 108 an inert gas such as nitrogen, carbon dioxide or some combination of such inert gases which will serve to exterminate insects which otherwise might occupy the space between the membranes and the rigid tank wall as explained above. Such gas can be within the membrane also.

During the period of time which the stored material remains in the container in transit, or in a plant, it is desirable for a slight positive pressure to be maintained between the membrane and the tank wall so that the membrane will hug the stored material to minimize the amount of air in contact with it, and to enable the air between the membrane and the tank wall to serve as thermal insulation between the exterior of the tank and the stored material. When the tank is to be unloaded, such as when the vehicle has reached its destination, the same technique can be used for unloading either the tank shown in FIGURES 16 and 17 or the container shown in FIGURES 18 and 19, as described above in connection with FIGURE 1. The membrane arrangements of these containers, however, does not require utilization of membrane control mechanism such as illustrated in FIGURES 3 to 10, for example.

In the membrane installation shown in FIGURE 18 the attaching means 14 for the open ends of the two membranes 3i are located considerably farther apart than the attaching means 14 for the open ends of the membranes 3h, shown in FIGURE 16. The length of the container must exceed twice the axial length of each of the membranes in order to enable both membranes to turn inside out completely. Moreover, the space between the membrane attach lines must be more than half of the axial length of each membrane, unless a special type of membrane control mechanism is used, such as shown in FIGURES 3 to 10. Otherwise it will not be possible to obtain a complete unloading operation of the container simply by manipulation of the membranes. Also, it is important that the discharge hoppers 102, or 102', be located respectively adjacent to the two attaching means 14 for the open ends of the membranes, so as to prevent the accumulation of discrete material on a shelf between such attaching means and a discharge hopper.

The first step in the unloading operation is to arrange for proper removal of material through the two hoppers, which will be described in greater detail later. When material can flow out of the discharge ports the material immediately above the hoppers 102, or 102', will move down through them first. Slope sheets 110 in FIGURES 16 and 17, and 110' in FIGURES 18 and 19, will facilitate movement of material from the side zones of the longitudinally central compartment of the container down into the hoppers. Alternatively, any of the means shown in FIGURES 8 to 15 could be substituted for this purpose. Aeration of the bridge 104, or vibration of the bridge, will deflect material between the hoppers into one or the other of them. Discharge of material from a tank structure such as shown in FIGURE 18 could be expedited further by providing an additional hopper 102' between the two there shown, which would enable the bridge 104 to be reduced greatly in size and to be replaced by two bridges instead of one.

When the discrete particle material in the space between the attachment means 14 has been discharged through the discharge hoppers and the faces of the bodies of material stored within the membranes have assumed a stable angle of repose, or even before such a stable condition is reached, gas under pressure may be supplied to one of the connections 108 to provide higher pressure between the corresponding membrane and the container wall than within such membrane. Gas thus supplied may have a pressure of as much as 50 pounds per square inch, for example, but the differential pressure across the membrane should not exceed 1½ pounds per square inch, to force the membrane to move into the central portion of the tank in turning inside out generally as illustrated by the broken lines in FIGURES 20, 21, 22 and 23, which illustrate representative sequential positions of the membrane. It will be seen from FIGURE 21 that, if the lower portion of the membrane is unrestrained except by weight of the stored material within the membrane, the entire closed end portion of the membrane will slide toward the central portion of the container while the portion of the cup-shaped membrane adjacent to its open end assumes a return bend shape, as illustrated in FIGURE 21.

As discharge of material continues the membrane will move farther toward inverted position, generally in the manner shown in FIGURE 22, until the forward bulge of the membrane engages the inclined slope face of the body of material stored within the opposite membrane. Because the membrane-attaching means are closer together in the arrangement shown in FIGURE 16 than in the arrangement shown in FIGURE 18, this engagement of the membrane with the face of material will occur sooner in the tank of FIGURE 16 than in that of FIGURE 18. In any event, when this situation does occur the supply of gas under pressure to the connection 108 behind the manipulated membrane should be cut off and suction should be applied to this connection, or such connection should be vented and gas under pressure supplied within such membrane, so that the membrane will be returned to its initial wall-lining condition.

Next, gas under pressure is supplied to the other connection 108 so as to force the other membrane out of wall-lining position and cause it to move through the inverting sequence illustrated in broken lines in FIGURES 21 and 22. Because most of the stored material has been emptied from the container as the result of the manipulation of the first membrane described, movement of the second membrane to be manipulated can progress from the position shown in FIGURE 22 to that of FIGURE 23, where the membrane will be inverted completely. It will be found that as the membrane approaches the completely inverted position it will dump a residue of the material stored in it which had lodged in the bottom crease of such membrane, as illustrated in FIGURE 22. If the attaching means 14 are spaced apart sufficiently far in relation to the axial length of the membrane being inverted, as shown in FIGURE 18, such residue will be dumped within the central portion of the container between the attaching means 14 so that it will be discharged through a hopper 102′.

On the other hand, if the axial extent of the membrane is sufficiently greater than the distance between the two membrane attaching means, as shown in FIGURE 16, at least a portion of such residue will probably be dumped beyond the central portion of the container. In that case it will be necessary to discontinue the application of differential pressure to the membrane being manipulated and to apply opposite differential pressure to such membrane for reversing movement of that membrane into wall-lining position again, and then to supply gas under pressure for the second time to the other connection 108 for again inverting the membrane which was first inverted in order to scavenge all of the stored material from the container.

In FIGURE 24 one type of discharge hopper arrangement is shown in detail. The construction of this hopper arrangement enables the material to be removed from the container in either one of two ways. In either instance a lower cover 111 spaced from an inner perforated, or porous, plate, sheet or pad 112 forms a plenum chamber 113, to which gas under pressure can be supplied through a connection 114 from a gas supply conduit 115. An outlet pipe 116 connected to a conveying pipe 117 will enable discrete particle material to flow out of the discharge hopper 102 from a location above the plate 112.

Alternatively the outlet pipe 116 can be closed and a butterfly valve 118 opened to afford access to an upright pipe 119 extending downward from the central portion of plate 112 through the lower cover 111 to a continuation 120 of gas-supply pipe 115. Normally the end of this extension is closed by a cap 121, but when the valve 118 is opened such cap should have been removed and a conveying pipe connected to the extension 120. Gas may be supplied from the gas-supply pipe 115 past check valve 122 to the pipe extension 120 for the purpose of boosting flow of the discrete particle material along the conveying pipe to its destination. The discharge hopper 102 can serve as an access opening to the interior of the container 100 by supporting the lower cover 111 and the plate 112 by a pivot 123 extending through flanges on these parts and a flange projecting outward from the lower end of the hopper. A securing bolt 124 may be loosened and swung out of registering notches in these flanges, so that the entire hopper cover assembly can be swung aside to open the lower end of the hopper.

If it should be desired to dump the load from the tank 100 quickly by gravity, the coupling 125 connecting the downwardly extending pipe 119 and a stub pipe 126 extending upwardly from conveyor pipe 120 can be disconnected. Material may then be dumped by gravity from the hopper at a controllable rate by swinging the cover 111 and the plate 112 about the pivot 123 different amounts to vary the degree to which the cover is moved out of registry with the lower end of the hopper. The air pipe 114 and conveying pipe 120 can be removed so as to leave the space below the hopper 102 unobstructed. Instead of removing such pipes from below the hopper, if this cannot be done easily, such pipes could simply be lowered slightly and a cap placed over the open upper end of the projecting pipe 126 after the coupling 124 has been removed so that, if the cover 111 is swung to open the lower end of the hopper 102 halfway or more, material will not spill into pipe 120 through the stub pipe 126.

In the alternate form of hopper construction 102″ shown in FIGURE 25, the hopper itself is like that shown in FIGURE 18. A single outlet pipe 116′ is connected to one side of the lower portion of the hopper just above a perforated or porous plate which may be like the plate 112 shown in FIGURE 24. The bottom cover for the hopper can be supplied with air under pressure so as to serve as a plenum chamber like the chamber 113 of FIGURE 24. Loosening of the particulate material above the plate will assist discharge of stored material through the outlet pipe 116′ or provide internal tank air under pressure to discharge and convey coarse materials.

To such outlet pipe a transition bend 127 is connected by a swivel joint 128 so that it can be turned between the solid line position at the right of FIGURE 25 and the broken-line position at the left. When the transition bend is swung to the right it can be connected to a relatively small diameter conveying pipe such as four inches in diameter and when the swivel bend is swung to the left position of FIGURE 25 it can be connected to a larger conveying pipe such as one five inches in diameter. The outlet pipe 116′ may be four inches in diameter and when material having fine particles, such as flour or cement, is being handled a four-in pipe is large enough, even for conveying the material away from the hopper. When the particulate material is composed of relatively large particles, however, such as grain, it is desirable to provide a larger conveyor pipe for handling such material, as would be provided when the transition bend is swung into the left broken-line position of FIGURE 25. More air at a higher velocity is required to convey coarse material than for fine particle products.

The type of discharge mechanism shown in FIGURE 18 is illustrated in detail in FIGURES 26 and 27. In this case the two outlet pipes 116′ from the hoppers are connected to branch conveyor pipes 129 both of which are connected to a specially designed Y fitting 130. The central connection or nozzle 131 of this Y can be connected to different sizes of common conveyor pipe depending upon the material being handled. Thus if the material is of fine particle type such as flour or cement the connection 131 may be to a pipe four inches in diameter; whereas if coarser material is being handled the common pipe could be five inches in diameter, and if the material particles are quite coarse the common pipe could be six inches in diameter. The flange joint cross section will be as large as the largest size of conveying pipe or hose capable of being attached.

The Y fitting 130 can be connected to the branch pipes 129 by swivel joints 132, so that the entire Y can be swung between the solid-line position and the broken-line position of FIGURE 27 to enable material to be discharged to one side or the other of the container from a central position in its length. To control the flow of material from an outlet pipe 116′ to a branch pipe 129 a butterfly valve 133 may be included in the line, which can be adjusted by a pneumatic actuator 134. Air under pressure may be supplied by a pipe 135 both to the branch pipes 129 and to the central connection of the Y. The latter connection may include a swivel joint 136, enabling such booster air connection to be swung with the Y through 180 degrees in the manner explained above.

In order to expedite filling of the tank several loading ports 109 are illustrated in FIGURES 16 and 18. Two of such ports at the left of each figure and two of such ports at the right of each figure are shown as being in registry with the cup-shaped membranes, respectively, when they are held in wall-lining position, as they are held during the tank-filling operation. It is therefore necessary to make provision for material to be loaded into the space within the membranes through such loading ports to pass through openings in the membranes themselves in positions corresponding to the locations of the loading ports. It is necessary, however, to insure that the openings in the membranes are closed and sealed when the loading ports are closed, so that a pressure differential can be created across each membrane for the purpose of moving it into and holding it in wall-lining position. Also it is desirable to prevent material from being deposited inadvertently in the space between the membrane and the tank wall. One expedient for accomplishing this result is illustrated in FIGURES 28 to 43.

First it is desirable to insure that the loading port covers 109 are held positively either in the closed position shown in FIGURE 28, or in the open position shown in FIGURES 29 to 33. In this way it is possible to ensure that the membranes are in proper wall-lining relationship before a hatch cover can be opened to admit material. Otherwise inadvertent opening of a hatch cover could allow material to be loaded into the zone between the membrane and the tank. Each cover is supported by an arm 137 which is apertured to receive a pivot rod 138 so that the cover can be swung about the rod as an axis, and can be shifted vertically to a slight extent along the rod. A helical torsion spring 139 encircling the pivot rod 138 is connected to such rod and to the arm 137, so as to exert a force urging the cover toward the closed position of FIGURE 28. Also, a helical compression spring 140 engaged between an arm 141 on which the pivot rod 138 is mounted and the arm 137 attached to the cover exerts a force tending to lift the cover upwardly into a position to clear the loading port coaming 142.

On the side of the coaming 142 opposite the hinge-suppotring arm 141 is mounted a pneumatically operated latch 143, which is illustrated in detail in FIGURES 34 and 35. A plunger 144 can be reciprocated by a diaphragm 145 subjected to differential pneumatic pressure between the projecting latching position of FIGURE 34 and the retracted released position of FIGURE 35. A spring 156 or pressurized air supplied through the connection 146 will deflect the diaphragm to the left, as seen in FIGURE 34, to project the plunger 144 into latching position. Atmospheric air admitted to the diaphragm chamber through the port 147 will deflect the diaphragm to the right for retracting plunger 144 in opposition to the force of spring 156 when suction is applied to the connection 146. In its projected position the plunger 144 can be engaged by a lug 148 projecting from the edge of the cover to hold the cover down, or prevent it from swinging toward open position, or both, but the plunger 144 is withdrawn out of the path of movement of such lug when it is reciprocated to the right into the retracted or released position shown in FIGURE 35.

Another latch mechanism 150, shown in detail in FIGURES 36 and 37, which is located in a position spaced from the coaming, is provided to hold the cover in the open position shown in FIGURES 29 to 33 against the force of torsion spring 139. Normally the plunger 151 of latch 150 is pressed to the left into the released position, as seen in FIGURE 37, by the compression spring 155. By atmospheric pressure acting on the diaphragm 153 through apertures 152 greater than the combined force of spring 155 and the pressure on the right side of the diaphragm 153 resulting from application of suction to the connection 154, the plunger 151 can be shifted to the right from the position of FIGURE 37 to the latching position of FIGURE 36. Such pressure is yielding pressure, however, so that when the lug 149 on cover 109 engages the inclined end of the plunger such plunger end will be wedged to the left in FIGURE 36 so that the lug may move past the plunger into the position shown in this figure.

When suction is applied simultaneously to the tank connection 108 behind the membrane 3h, to the connection 146 and to the connection 154, which are interconnected as shown in FIGURE 16, the membrane will be moved into wall-lining position, the plunger 144 will be retracted to release the lug 147, and latch 150 will be conditioned for latching. When the cover-securing means, if any, have been unfastened the force of compression spring 138 will lift the cover 109 upward out of engagement with the coaming 142. It is then necessary for the cover to be swung manually about pivot rod 138 away from its position in registry with the loading port 101 in opposition to the force of torsion spring 139 into the open position shown in FIGURES 29 to 33. By such movement the lug 149 will be wedged past the end of plunger 151 into the latched position of FIGURE 36. The cover will be held in this position during the loading operation when the membrane is held in wall-lining position.

On completion of the loading operation, or when it is desired to compact the material loaded, it is merely necessary to release the application of suction to the connections 108, 146 and 154, which are interconnected, whereupon spring 155 of latch 150 will move plunger 151 to the left, as seen in FIGURE 37, out of engagement with lug 149. Torsion spring 139 will then swing the cover about the pivot rod 138 into registry with the coaming 142. Swinging of the cover will be stopped in this position by engagement of the lug 149 with the stop pin 157, shown in FIGURES 31, 32 and 33, and lug 148 will have wedged past the beveled end of plunger 144. To complete the closing movement of the cover it is then only necessary to press it down manually in opposition to the upward force exerted by compression spring 140 until lug 148 wedges plunger 144 farther to the right, as seen in FIGURE 34, sufficiently to enable the lug to pass the plunger. Compression spring 156 will then urge the plunger to the left into the cover-latching position shown in FIGURE 34 in which the lug 148 will be held down until suction again is applied to the connections 108, 146 and 154.

If suction fails so it cannot keep the membranes in wall-lining relationship, the hatch covers will be automatically released by retraction of plungers 151 as explained above, the torsion springs 139 will close the hatch covers, and latches 143 will hold them in such closed positions. When sufficient suction has been restored to move the membranes into wall-lining relationship, to release the plungers 144 of latches 143 from lugs 148 and to move the plungers 151 of latches 150 into latching position, the covers may again be swung into and held latched in their open positions.

At the location of each loading port 101 the membrane 3g will be provided with a neck 158, which is of a length to extend upward through the coaming 142 to a location a substantial distance above the upper edge of the coaming when the membrane is in the wall-lining position of FIGURES 16 and 30. Such neck 158 is made of limp material and when its upper end is open such end can be folded down over the coaming 142, as shown in FIGURE 31, and, if desired, secured by a suitable band, or affixed to the neck itself. As discussed, prior to commencement of the loading operation the membrane 3g will be held in wall-lining position, such as by applying suction through connections 108 to the space between the membrane and the container wall and venting the interior of the membrane through connection 103. The suction at the loading port will not be appreciably impaired by such port being open because a seal encircling such port is interposed between the membrane and the container wall. Such seal is a rib which preferably is attached to the inner side of the container wall, but may be carried by the membrane. Such sealing rib 159 can be of solid material as shown in FIGURE 29, or may be hollow as rib 159' shown in FIGURES 30 and 32, or it can be inflatable like rib 159" shown in FIGURE 28.

When the membrane neck 158 has been pulled up through the coaming 142 and folded over its upper edge, as shown in FIGURE 31, material can be loaded into the interior of the membrane 3g through the loading port, such as through a supply pipe spout 160, as shown in FIGURE 32. It is not necessary for the slider 162 to be fully open during the filling operation, in every instance. When a supply pipe spout 160 is extended through the neck 158 and coaming 142, as shown in FIGURE 32, the neck can be turned up around the spout and the slider can be moved toward it until the open portion of the neck embraces the spout closely. The neck 158 can be suspended in this position by attaching to a suitable hook on spout 160 a chain which is connected to a ring of the slider 162.

When a loading operation has been completed, or is interrupted, it is necessary to close the outer end of the neck 158 so that the entire membrane will be sealed in order to enable a differential pressure to be exerted on it for manipulating it. It is desirable to be able to close the end of the neck 158 quickly, easily and tightly and it is further essential that the neck not be allowed to drop down through the coaming and the loading port any great distance without being entirely closed. Mechanism capable of preventing such an occurrence is shown in FIGURES 30 and 38 to 43.

The end of the neck 158 is closed by squeezing it flat and connecting the opposite edges by the separable fastener 161. It is necessary that this separable fastener be of the type which will make a fluid-tight joint when the fastener is closed. Lock mechanism is provided to engage the slider 162 when the fastener is closed so that the slider must be fully closed and cannot be opened inadvertently when the lock mechanism is engaged with the slider. By providing a key 163 for such lock mechanism which is carried by the end of a chain 164 anchored at the exterior of the loading port 101, it is impossible to drop the neck 158 through the loading port in opened condition without having the chain 164 connected to such neck by which it can be retrieved easily back through the loading port, and which will prevent inadvertent closure of the hatch cover unless the membrane is sealed and the key and chain withdrawn out of the hatch coaming.

The details of the slider-locking mechanism 165 carried by one side of neck 158 are shown in FIGURES 39 to 43. In one side of the locking mechanism is a bore 166 into which the stem 167 of the slider 162 can be inserted, as indicated by the arrow in FIGURE 43, into the position shown in FIGURE 40. Insertion of such stem will force to the left, from the position of FIGURE 43 to that of FIGURE 40, a spring-pressed plunger 168, which also slides in the bore 166. Such plunger is urged toward the right, in FIGURES 40 and 43, by a compression spring 169 and its movement to the right is limited by a flange 170 on its end remote from the opening of bore 166.

When the stem 167 has been pushed fully into the bore 166 to the position shown in FIGURE 40 the shallow annular groove 171 is in registry with a bore 172 in the lock mechanism extending transversely of the bore 166 and offset slightly from such bore. The stem 173 of the key 163 may be pushed in the direction indicated by the arrows in FIGURES 39 and 41 into the bore 172 until the key reaches the position shown in FIGURE 43. At that time its shallow annular groove 174 will be in registry with the bore 166. When the key stem is not inserted in bore 172 plunger 175 is projected into such bore by the compression spring 176 into the limiting position shown in FIGURE 39, in which the flange 177 on the end of plunger 175 is engaged with the shoulder in bore 172 spaced from the opening of such bore.

In general, the function of the locking mechanism is to insure that either the key 163 or the slider 162 will be held in the locking mechanism. When the key is held in the locking mechanism, as shown in FIGURE 38, the neck can be opened by withdrawing the slider 162 to the right, as seen in FIGURES 38 and 43, but the neck can move downward through the loading port 101 only as far as permitted by the length of chain 164 attached to the key 163. Under these circumstances the key cannot be withdrawn from the bore 172 because the plunger 168 in intersecting bore 166 will be engaged in the shallow groove 174 of the key, in the position of FIGURE 43, to prevent it from being withdrawn. The plunger 168 is, of course, held in this key-retaining position by the compression spring 169.

When it is desired to close the opening in the neck 158 and the cover 109, slider 162 is moved toward the locking mechanism to close the neck opening and its stem 167 is moved into the bore 166 from the position of FIGURE 43 to that of FIGURE 40. By such movement the plunger 168 is forced to the left to the position of FIGURE 40, so that the shallow groove 171 of the slider stem 167 is in registry with the bore 172. The key 163 can then be withdrawn from such bore and spring 176 will urge plunger 175 to follow the stem until it reaches the position shown in FIGURE 39. In that position the plunger will be lodged in the shallow groove 171 of the slider stem 167 so that it cannot be withdrawn and the slider will thus be held in fully closed position. The key 163 and its chain 164 can then be withdrawn from the loading port, the closed neck 158 can be dropped down through the loading port into the position shown in FIGURE 29, and the cover 109 can be moved into closed position, as described above.

FIGURES 44 to 47 illustrate an alternative type of construction which can be used in conjunction with a membrane or membranes installed in a portion of a tank 100 instead of the separable fastener locking mechanism of FIGURES 38 to 43, so that a loading port 101 would be covered by the membrane when it is in the wall-lining position indicated by the membrane 3j in FIGURE 44 to prevent inadvertent entry into the space between the membrane and the tank wall of material being loaded. Details of the container, the loading ports and the discharge hoppers are not shown in these figures because they could be generally similar to the loading port structures and discharge hopper structures described above. In this structure an accordion tube 178 has one end secured to the wall of the container 100 encircling the loading port 101 and the other end is secured to the membrane 3j with its end encircling an opening 101' extending through the membrane. The tube is formed so that it can be extended from the contracted condition shown in FIGURE 44 into the arcuate extended condition of FIGURES 45 and 46.

As the membrane moves from the wall-lining position of FIGURE 44 into the inverted position of FIGURE 45, the extension of the tube 178 will gradually be increased. This tube must be of a length exceeding twice the distance between the loading port 101 and the membrane-attaching means 14, because as the membrane is inverted the aperture 101' in it will move from a position in registry with the loading port 101 into a position at the opposite side of the attaching means 14 and approximately the same distance from such attaching means, as shown in FIGURES 45 and 46. If there were no support for the accordion tube 178 between its ends it would sag downward into the container so far that it would be difficult to arrange its pleats in registry when the membrane 3j is moved back into wall-lining position. Consequently supporting strips 179 connect portions of the accordion tube spaced lengthwise of it and the wall of the container 100 generally at the location of the membrane-attaching means 14 because such means are approximately midway between the extreme positions of the membrane aperture 101'.

In order to guide the central portion of the accordion tube 178 during its contracting movement so that its pleats will be arranged in stacked relationship, as shown in FIGURE 44, when the membrane 3j is in wall-lining position, the supporting strips should be of a length substantially equal to the distance between the loading port 101 and the membrane-attaching means 14, as shown in FIGURE 46. When the membrane is in its completely inverted position, therefore, as shown in FIGURES 45 and 46, the supporting strips 179 will extend generally radially from the top of the container 100 at the location of the attaching means 14. The accordion tube will therefore assume approximately a semicircular arcuate shape, but the pleats need not be spaced apart exactly equally and their spacing will depend to a considerable extent on the stiffness of the material of which the tube is made. If the material is quite limp the pleats toward the ends of the tube may be spread to a greater extent than the pleats nearer the center of the tube, particularly when the tube is not fully extended. Representative construction of a telescoping accordion tube 178 and supporting strips 179 made of fabric is shown in FIGURE 47.

If material were loaded through the port 101 and the accordion tube 178 in its contracted condition of FIGURE 44, material would tend to collect in the creases of the pleated tube. It is preferred to protect such creases against the accumulation of material being fed into the container by providing within the accordion tube at its end adjacent to the membrane aperture 101' a neck 158' of flexible material such as fabric, which is shown in FIGURE 46. One end of this neck is connected to the diaphragm around the aperture 101' and the other end of the neck is closable by a fluid-tight separable fastener 161. The tube 178 should be slightly porous, or have in it a small pressure-equalizing passage, so that the pressure on its opposite sides will be equalized when its inner end is sealed by the neck 158' and fastener 161 preparatory to an inverting movement of the membrane 3j so that the tube will not be held contracted.

When the membrane 3j is in its container wall-lining position so that the accordion tube 178 is in its contracted position shown in FIGURE 44, the closed end of the neck 158' can be drawn upward through the coaming 142, the separable fastener opened and the upper end of the neck can be folded down over the upper edge of the coaming in the manner illustrated in FIGURE 31. Material can then be loaded into the container in the manner described above without any such material accumulating in the folds of the tube 178 because of the protection afforded by the neck 158'. Alternatively the separable fastener 161 can be partially closed to clamp the outer end of the neck around a material supply pipe 161, such as illustrated in FIGURE 32.

In the membrane installation illustrated in FIGURES 48 and 49 the cup-shaped membranes installed in opposite ends of the tank 100 may be similar to any of the membrane arrangements discussed above. In this embodiment, however, a further membrane 180 is provided which extends between the two attaching means 14 of the end membranes. The membrane 180 is substantially a sleeve, which would be of generally cylindrical shape if the container 100 were cylindrical. The lower portion of this membrane is secured around the discharge ports 102 and the opposite sides of the intermediate bridge 104 in cases where this is provided. Two filling ports 101 are shown in the container between the attachment means 14 for the end membranes, and the central membrane 180 has apertures 101" in it disposed in registry with the loading ports 101. Also, this membrane has in it an aperture 103' which is in registry with the connection 103 for venting the interior of the container between the end membranes, or supplying to such central portion air under pressure, or connecting to it a suction source.

As has been discussed above, it is desirable during loading of a container to press a membrane down onto the stored material for the purpose of compacting it and thus reducing the explosion hazard within the membrane while increasing the insulating air space between such material and the container wall. To enable the membrane 180 to be moved downward a substantial distance to engage material stored in the central portion of the container between the two membrane attaching means 14, the membrane must have fullness lengthwise of the container so that its upper portion can move downward away from the top of the container generally into the position shown in FIGURE 48. In order to maintain the apertures 101" in the membrane closed under such circumstances, the safety closure lock mechanism described in connection with FIGURES 30 and 38 to 43 can be used. Alternatively, an accordion tube 178' has its opposite ends connected to the container in a position encircling the loading port 101 and to the membrane 180 encircling the port 101". A further accordion tube 178" may have its opposite ends connected to the container wall in a position encircling the connection 103 and to the membrane 180 in a position encircling the aperture 103', respectively. In the lower end of each such tube is an aperture-closing neck 158' like that shown in FIGURE 46, which can be sealed by a separable fastener 161. Also a small pressure-equalizing aperture through each tube should be provided as in the tube 178 of FIGURE 46.

As differential pressure is applied to the membrane 180, either by connecting a suction source to the connection 103" and opening the vent 103, or by connecting a source of air under pressure to the connection 103 and venting the connection 103" to atmosphere, the membrane 180 will be held substantially in wall-lining position even though there may be some folds in the membrane material resulting from its fullness lengthwise of the container. When the differential pressure acting on the main membrane is reversed, such as by connecting a suction source to the opening 103 and either venting the connection 103" to atmosphere or applying a source of air under pressure to such connection, the membrane will be pressed down onto material stored in the central portion of the container. As the upper portion of the membrane 180 thus moves downward from the top of the container the membrane apertures 101" and 103' will remain sealed from the space between the membrane and the container wall, so that no material loaded into the container can enter this space. Alternatively inert gas, instead of air, can be supplied to the space between the membrane and the container wall without coming into contact with the stored material enclosed by the membrane 180.

The membranes 3k in the container 100 of FIGURES 50 to 52 are similar to the membranes 3i in FIGURE 18, except that they are of circular cross section like the membranes 3h of FIGURE 16. The membrane-attaching means 14 for the skirts of the membrane are, however, spaced apart similarly to the attaching means of FIGURE 18. Also the filling ports 101 and covers 109 and the connection 103 are similar to these parts in FIGURE 16. The apertures in the membranes 3k can be constructed like the ones illustrated in FIGURES 30, 31 and 32 or like the illustration of FIGURES 45 to 47. The principal difference in the container of FIGURES 50 to 52 over those shown in FIGURES 16 to 19 is in the discharge arrangement.

In the bottom of the car 100, as shown best in FIGURES 51 and 52, is provided a wide slot 181 of a length substantially equal to the spacing between the attaching means 14 for the skirts of the two cup-shaped membranes 3k. While normally such slot would greatly weaken the car and make it impractical to pressurize it, the hoop strength of the central portion of the car is preserved by connecting opposite sides of the slot by tie rods 182. The slot is then closed by a shell 183 beneath it which preferably is rigid and is of generally cylindrical or conical arcuate section having a curvature with a radius much shorter than the radius of curvature of the tank 100. By use of this double shell construction in the central portion of the tank with tie rods 182 joining the opposite sides of the slot between such sections, the hoop strength of the structure is maintained so that it will be highly resistant to internal pressure.

Because the slot 181 preferably is of a width which will prevent any appreciable accumulation of particulate material along the sides of the central portion of the tank, and because the length of such slot is at least substantially as great as the spacing between the attaching means 14 for the two membranes, the entire central portion of the tank between the membrane-attaching means can be emptied by gravity. Also, the slot will be sufficiently long, as shown in FIGURE 50, so that a membrane 3k in its completely inverted position cannot close entirely the area of the slot. In order to empty that part of the central portion below the tie rods 182, however, it may be desirable to provide some arrangement supplementing gravity to move material to the central outlet opening 184 from which the material is discharged through one or the other or both of outlet pipes 185. For fine material the lower shell portion 183 may be covered by a porous mat 186 through which air can be supplied, or this portion of the tank bottom can be vibrated to place the material in suspension so that the material will flow readily to the outlet opening 184 despite the gradual slope of the shell portion 183 longitudinally of the tank toward such outlet. Coarse material can be moved mechanically such as by screw or flight conveyors.

FIGURES 53 to 59 show various types of joints by which membrane elements of the present invention can be secured to the inner walls of any of the tanks or containers described above. A common characteristic of most of these joints is that the edge portion of the membrane is wrapped around a marginal tube which is confined in a groove and is inflated with fluid under pressure, both to secure the edge portion of the membrane and to seal such edge portion in fluid-tight relationship to the container wall. Also, each of the constructions shown in FIGURES 53 to 55 and 57 to 59 includes a removable slot-obstructing member obstructing the slot forming the opening to the groove. When such member is removed access to the groove enables the tube to be inserted before or after being inflated. The slot-obstructing member can then be placed to restrict communication with the groove to a narrow slit through which the edge portion of the membrane extends, but which prevents escape of the marginal tube or cord 63.

In FIGURE 53 the container wall 52 has welded to it a joint strip 53 of special profile which is shown separately in the exploded view of FIGURE 54. The profile of this strip provides the groove 54 of special cross-sectional contour shown as being undercut at opposite sides to leave a groove entrance slot 55 considerably narrower than the maximum width of the groove. Such strip 53 is curved longitudinally if it is to be applied to a curved tank wall. Preferably the groove 54 is located approximately midway between opposite edges of the strip and such opposite strip edges are secured by welding to the container wall 52 if both the strip and such wall are metal.

As has been mentioned above, for some purposes it may be desirable for the container walls to be flexible, such as being of fabric-reinforced rubber or plastic material. In that event the edge portion of the membrane 3 can be reinforced, such as being folded and the fold bonded, and such reinforced membrane edge can then be vulcanized or otherwise suitably bonded directly to the container flexible wall. The specific marginal structures for the membrane 3 shown in FIGURES 53 to 59 are all of the rigid type intended to be used with rigid-walled containers.

In the membrane-to-container wall joints shown in FIGURES 53 to 55 and 57 to 59 the membrane edge-retaining grooves all open in a direction parallel to the container wall. The groove entrance slot 55 in each of FIGURES 53 to 55 and 57 is of a width great enough to receive tubing 56 into the slot by movement of such tubing transversely of its length. The contour of the side of the groove remote from the wall 52 preferably is generally complemental to the shape of the tubing. For purposes of inflation the tubing 56 in FIGURES 53 and 54 is shown as having a valve stem 57 which can be projected through an aperture 58 in the wall of the strip remote from the container wall 52. If desired, such aperture may be in the form of a deep notch in the strip flange forming one wall of the groove so that the valve stem can enter the aperture 58 by movement of the stem transversely of its length instead of by longitudinal movement.

From the relationship of the joint strip 53 and the marginal tubing 56 shown in FIGURE 54, the edge portion of the membrane 3 is wrapped around the tubing and then the tubing is moved transversely of its length through the slot 55 into the groove 54 to the relationship shown in FIGURE 53. If the tubing is then moved away from the wall 52 to seat in the groove a space will be left in such groove between the tubing and the wall of the groove adjacent to the container wall 52. Moreover, the side of the groove adjacent to the container wall is undercut, as shown in FIGURE 54, behind an adjacent portion of the strip wall. Into the space between such undercut portion of the groove and the tubing 56 an edge of a retainer 59 can be inserted through the groove entrance slot 55 from the position of FIGURE 54 to that of FIGURE 53.

It will be noted that in the structure of the strip 53 shown in FIGURES 53 and 54 the undercut portion of the groove 54 adjacent to the container wall 52 is of concave shape. The edge of the retainer 59 insertable into the groove 54 is of complemental convex shape on one side and the opposite side is concave, preferably of a curvature generally corresponding to the curvature of the adjacent side of the tubing 56. When the edge of retainer 59 has thus been inserted into the strip groove 54, therefore, the tubing 56 will be embraced rather closely between the wall of the groove 54 remote from the container wall 52 and the inserted edge portion of the retainer 59. Moreover, such retainer will have restricted the passage through the groove entrance slot 55 sufficiently to prevent escape of the tubing 56 from the groove, although the remainder of the slot is sufficiently wide to enable the two thicknesses of the membrane 3 to pass easily through it when the retainer edge portion is in the groove.

Also, it is preferred that the edge portion of the retainer 59 be inserted into the groove 54 by a combined edgewise advancing and swinging movement so that when the retainer has been moved into the position shown in FIGURE 53 the retainer cannot drop out of the groove, even if the groove entrance slot 55 opens downwardly, as shown in FIGURES 53 and 54, and tube 56 is not inflated. In fact, the retainer could not even be pulled directly downward because of the fit of its convex protuberance of the undercut portion of the groove. To facilitate removal of the retainer, therefore, an aperture 60 is provided in the retainer strip at a location spaced from its edge inserted in the groove 54 to enable a pointed tool to be engaged in the aperture 60 for swinging the retainer strip relative to the container wall 52 so that the retainer edge portion can be withdrawn from the groove 54.

In FIGURE 55 the joint strip 53' is generally similar to the joint strip 53, shown in FIGURES 53 and 54. While the strip 53' of FIGURE 55 is of cast construction its cross-sectional shape is somewhat different from that of the strip 53. In the joint structure shown in FIGURE 55 the undercut portion of the groove 54 is formed by a projecting ledge 61 cast integral with the strip 53'.

While the retainers 59 of FIGURES 53 and 54 and 59' of FIGURE 55 are of different cross-sectional shapes best suited in each case to the particular joint strip structure, both of such retainers function in the same manner and can be composed of sections of the same length. In each instance the section should be quite short where there is appreciable curvature of the wall 52. The retainer 59' of FIGURE 55 has a shoulder engageable with the projection 61 to support the retainer positively. The retainer 59' of FIGURE 55 also has in it a hole 60 in which a tool can be engaged to swing the retainer for disengaging its shoulder from the ledge of the strip formed by the projection 61.

The shapes of the grooves formed cooperatively by the joint strips and the retainers in FIGURES 53 and 55 in which the marginal tubing 56 is confined differ somewhat in shape. In FIGURE 53 the resultant groove is of substantially circular cross section. The groove formed by the structure shown in FIGURE 55 also is of substantially circular cross section, except that the walls of the strip cavity 53' and retainer 59' are scalloped lengthwise to provide an irregular surface engageable by the tubing-backed membrane 3 to afford a more positive grip on the edge portion of the membrane.

When the tubing 56 is inflated by air under pressure supplied through the connection 57 the tubing will stretch somewhat and become much more rigid, so as to avoid any possibility of the tubing being pulled from the joint by pulling membrane 3. Moreover, inflation of the tubing in each instance will cause it to expand into the groove and clamp the edge portion of the membrane 3 tightly between the tubing and the joint strip. In order to eliminate all possibility of the tubing being pulled from the groove in the event that it should become punctured or deflated for any other reason, a rope 63, shown in FIGURE 55, can be inserted through the hollow interior of the tubing 56, so as to limit the extent to which the tubing can be contracted in cross section, without interferring with the inflatability of the tube. Such rope preferably is much smaller than the tube hollow.

In FIGURE 57 a somewhat different type of fabricated membrane anchoring and sealing type of joint is illustrated. In this instance the tubing-receiving groove is of generally rectangular cross-sectional shape and the access slot to such groove is at least as wide as the maximum width of the groove. Such access slot is, however, blocked by a removable groove-obstructing member which almost completely closes the entrance to the groove receiving the tubing 56 and the edge portion of the membrane 3 wrapped around it. This type of structure is particularly well suited to the economical formation of a cavity for receiving and retaining marginal tubing of different sizes which it may be desirable to use.

The tubing-receiving groove 54" is formed by a strip 64' disposed with its width extending perpendicular to the container side 52. The edge of this strip abutting the container wall is welded to it and its opposite edge is engaged with and welded to the underside of a strip 65 bent to provide one edge portion bridging between strip 64' and the container wall, and its other edge portion overhanging the side of strip 64' remote from the edge portion of strip 65 extending to the container wall 52.

The access opening to the groove is closed by a bar 66 of angular cross section, having a flange portion disposed parallel to the container wall 52 which is secured to the strip 65 by cap screws 67. The other flange of bar 66, disposed perpendicular to the container wall, is somewhat narrower than the width of bar 64' so as to provide a narrow opening between the container wall 52 and the edge of bar 66 adjacent to it for passage of the edge portion of membrane 3. The tubing 56 is thus confined between the bars 64' and 66. To insure that pulling force on the membrane 3 cannot move the tubing 56 between bar 66 and the container wall 52 a rope 63 of the type previously described in connection with FIGURE 55 can be threaded through the tubing to limit the extent to which such tubing can be squeezed in the event that it should be deflated for any reason.

To insure that the tubing 56 cannot escape from the groove between the container wall 52 and the angle 66 a yieldable rubber strip 68 of triangular cross section is inserted into the groove between the container wall 52 and the tubing 56 with a wider portion adjacent to bar 64' forming the groove bottom and a narrower portion adjacent to the passage between the container wall and angle 66. Preferably a portion of the strip 68 actually extends between the angle flange and the container wall, and the thickness of such portion and the width of the angle flange are such that the edge portion of such flange presses the edge portion of the membrane 3 firmly against the yieldable strip 68 to deform it to some extent and secure such strip positively in the groove. The combination of the strip 68, the tubing 56 and the rope 63 threaded through the tubing thus guarantees that the edge portion of membrane 3 cannot escape from the groove 54" and effects a continuous fluid-tight seal.

In the joint shown in FIGURE 57, a valve stem connected to the tubing can simply extend through the angle retainer 66 and such a valve stem is designated 57 in that figure. Therefore, the tubing 56 can be inflated after it has been secured in place by the joint structure in the manner shown in this figure.

Alternatively, if the tube 56 is expanded by supplying fluid under pressure to its interior prior to its insertion into the joint-retaining groove the provision of a valve stem would not be necessary. Fluid could be injected into the tube through a hypodermic type of hollow needle which could simply pierce the wall of the tube. After inflation of the tube the needle could be withdrawn and the material of the tube wall would expand to seal the puncture made by the needle automatically. Such inflation of the tube 56, whether performed prior or subsequent to insertion of the tube into the tube-retaining groove of the joint, could be either gas under pressure or liquid. If liquid is injected into the tube after it has been installed and confined in the tube-retaining groove of the joint, such liquid could be in the form of a suitable resin which would set in place within the tube to form a solid structure. If desired, such resin could be of the foaming type to exert internal pressure within the tube as it sets.

The membrane skirt-attaching means shown in FIGURES 53 to 57 all include members of somewhat angular shape which it might be necessary to preform to the curvature of the wall 52 before they could be welded in place. FIGURES 58 and 59, on the contrary, illustrate membrane edge-attaching means which are composed of rods or tubes and which, therefore, can be bent readily to any curvature of reasonably large radius. Unless the radius of curvature is quite large, it would be desirable to assemble the components in place instead of assembling them prior to placement in the container. On the other hand, such components could be assembled in a jig corresponding to the curvature of the container wall. In either case, no special complicated forming operation is required.

In FIGURE 58, the principal component of the attaching means is the rod 187 which is welded to the container wall 52 along the desired line of membrane attachment. The smaller cylindrical rod 188 is then welded onto the larger rod 187 so as to provide a groove for receiving the edge portion of the membrane 3. This groove is closed by a wedging rod 189 which can be drawn into the groove entrance slot between the rod 188 and the wall 52 by bolts 190 extending through substantially diametral apertures in the rod 187 and which are spaced along the length of such rod. To trap the edge portion of the membrane 3 in the groove formed between the rods 187, 188 and 189, the edge portion of the membrane is wrapped around a yieldable strip 191 which is received in such groove. Such strip may be of circular cross section and can be made of solid elastomer material. Bolts 190 can be tightened sufficiently to press rod 189 against the edge portion of the membrane and clamp tightly that portion encircling the strip 191.

The structure of the membrane edge-attaching means shown in FIGURE 59 is similar to that of FIGURE 58. In this instance, however, the main rod member 187′ is of tubular construction instead of being of solid structure like the rod 187 of FIGURE 58. Also, instead of the resilient strip around which the edge portion of the membrane is wrapped being solid, the strip 192 is hollow and, if desired, can be inflated as discussed above by supplying air under pressure or a liquid to its interior through a valve 57′.

It will be evident that any of the membrane edge-attaching means illustrated in FIGURES 53 to 59 inclusive can be used interchangeably for securing in place the edges or skirts of membranes in installations requiring continuous sealing which are readily removable and which do not require penetration of the membrane.

The membrane used in the present invention should be substantially dimensionally stable, that is, it should not be appreciably stretchable. Various types of materials can be used for this purpose, but the membrane should be sufficiently strong to withstand without question the stress to which it will be subjected by differential pressures on its opposite sides when the membrane is unsupported. At the same time, the membrane should not be sufficiently strong to withstand pressures appreciably in excess of those to which it may be subjected because, to provide a membrane capable of withstanding much greater stress than would be required, would increase the expense of such membrane considerably. As has been pointed out above, even in unloading material from the container the differential pressure across the membrane should not exceed 1½ pounds per square inch, which is sufficient to overcome the sliding friction that occurs.

A membrane used in the construction and in accordance with the method described above preferably is a textile coated with appropriate sealing material. The membrane selected for use should be such that the operation of such a membrane in accordance with the present invention does not require that the textile constituting the foundation for the membrane be subjected to a fiber load or tenacity exceeding 1.5 grams per denier which should not produce an elongation exceeding three percent in any portion of the membrane.

I claim as my invention:

1. Unloading mechanism for a horizontally-elongated container to hold discrete particle material comprising a flexible cup-shaped membrane adapted to be disposed in container-lining relationship with an end wall and with portions of the top, bottom and side walls of the container and having an end wall in upright position when in such container-lining relationship and top and bottom side walls extending from said membrane end wall in generally horizontal position when in such container-lining relationship, said side walls of said membrane being of an axial extent less than one-half of the horizontal extent of the container, attaching means spaced from said upright membrane end wall when in such container-lining relationship and securing the edge portions of said side walls to the wall of the container substantially in an upright plane spaced from such container end wall, and discharge means located immediately at the side of said attaching means opposite said membrane end wall in container-lining relationship and including an outlet located at the bottom of the container for removal of material from the container by inversion of said membrane from wall-lining relationship into a position in which a portion of the bottom of said membrane is in overlying registry with said discharge means.

2. Unloading mechanism for a horizontally elongated container to hold discrete particle material comprising a flexible cup-shaped membrane adapted to be disposed in container-lining relationship with an end wall and with portions of the top, bottom and side walls of the container and having an end wall in upright position when in such container-lining relationship and top and bottom side walls extending from said membrane end wall in generally horizontal position when in such container-lining relationship, attaching means spaced from said upright membrane end wall when in such container-lining relationship and securing said top and bottom membrane side walls to the container top and bottom, respectively, at locations respectively spaced from such container end wall equal to the axial extent of said membrane top and bottom side walls, discharge means located immediately at the side of said attaching means opposite said membrane end wall in container-lining relationship and including an outlet located at the bottom of the container for removal of material from the container by inversion of said membrane from wall-lining relationship into a position in which a portion of the bottom of said membrane is in overlying registry with said discharge means, and additional means including a displaceable liner independent of said membrane extending upward from the bottom portion of the container, said liner being shiftable from a position lining the container wall into a position in which a portion of said liner is spaced from the container wall for effecting movement down to said discharge means of discrete particle material at the same side of said attaching means as said discharge means.

3. Unloading mechanism for a horizontally elongated container to hold discrete particle material comprising a flexible cup-shaped membrane adapted to be disposed in container-lining relationship with an end wall and with portions of the top, bottom and side walls of the container and having an end wall in upright position when in such container-lining relationship and top and bottom side walls extending from said membrane end wall in generally horizontal position when in such container-lining relationship, attaching means spaced from said upright membrane end wall when in such container-lining relationship and securing the edge portions of said side walls to the wall of the container substantially in an upright plane spaced from such container end wall, discharge means including an outlet located at the bottom of the container immediately at the side of said attaching means opposite said membrane end wall in container-lining relationship for removal of material from the container by inversion of said membrane from wall-lining relationship into a position in which a portion of the bottom of said membrane is in overlying registry with said outlet, and additional means including a displaceable liner in said container adjacent to said outlet, independent of said membrane and shiftable from a position engaging the container wall into a position in which a portion of said liner is spaced from the container wall to move material toward said outlet in a direction transversely of the direction of movement of material toward said outlet effected by movement of said membrane.

4. The unloading mechanism defined in claim 3, the discharge means including a discharge port located substantially centrally between opposite sides of the container, the membrane being movable toward said discharge port in a direction substantially parallel to such opposite sides of the container, and the additional means also includes a second displaceable liner disposed at each of the opposite sides of the discharge port.

5. The unloading mechanism defined in claim 4, the displaceable liners being flexible and movable from bent positions in engagement with the wall of the container toward straightened chordal positions.

6. The unloading mechanism defined in claim 5, each of the liners including an inflatable pocket.

7. The unloading mechanism defined in claim 6, each of the liners including a plurality of inflatable pockets disposed in side-by-side parallel arrangement with their lengths extending substantially parallel to the direction of movement of material effected by the membrane.

8. The unloading mechanism defined in claim 5, the liners including an elongated inflatable pocket having its length extending substantially peripherally of the container.

9. The unloading mechanism defined in claim 5, the liners including an elongated inflatable pocket having its length extending substantially parallel to the direction of movement of material effected by the membrane and a second elongated inflatable pocket having its length extending peripherally of the container.

10. The unloading mechanism defined in claim 6, the liners including substantially parallel walls forming opposite sides of the inflatable pocket, and means interconnecting said walls to dispose them in substantially parallel arrangement when the pocket is inflated.

11. Unloading mechanism for a horizontally elongated container to hold discrete particle material comprising a flexible cup-shaped membrane adapted to be disposed in container-lining relationship with an end wall and with portions of the top, bottom and side walls of the container and having an end wall in upright position when in such container-lining relationship and top and bottom side walls extending from said membrane end wall in generally horizontal position when in such container-lining relationship, attaching means spaced from said upright membrane end wall when in such container-lining relationship and securing the edge portions of said side walls to the wall of the container substantially in an upright plane spaced from such container end wall, discharge means located at the bottom of the container at the side of said attaching means opposite said membrane end wall in container-lining relationship for removal of material from the container by inversion of said membrane from wall-lining relationship into a position in which a portion of the membrane is in vertical registry with said discharge means, and holding means adjacent to said attaching means operable to hold the lower portion of said membrane substantially in lining relationship to the bottom of the container while the upper portion of said membrane moves toward inverted condition to deter obstruction of said discharge means.

12. The unloading mechanism defined in claim 11, the discharge means being discharge port means opening through the lower portion of the container and disposed adjacent to the membrane-attaching means.

13. The unloading mechanism defined in claim 11, the holding means including suction means.

14. The unloading mechanism defined in claim 11, the holding means including magnetic means.

15. The unloading mechanism defined in claim 11, the holding means being operable to stiffen the lower portion of the membrane.

16. The unloading mechanism defined in claim 15, the holding means being operable to vary the area of the portion of the membrane stiffened.

17. The unloading mechanism defined in claim 15, the stiffening means including a plurality of inflatable pockets in side-by-side relationship.

18. The unloading mechanism defined in claim 17, the pockets being disposed with their lengths extending substantially parallel to the direction of the movement of the membrane.

19. The unloading mechanism defined in claim 17, the pockets being disposed with their lengths extending transversely of the direction of the movement of the membrane.

20. Unloading mechanism for a horizontally elongated container to hold discrete particle material and having ends, side wall portions and bottom wall portions, a liner having a lower portion anchored to the bottom wall portion of the container and an upper portion anchored to a portion of the container wall above the anchored lower portion and spaced from the container ends, said liner being of a length to engage the portion of the container wall between said upper and lower anchored liner portions, and said liner including a band of pockets joined inside-by-side relationship and inflatable to spread opposite sides of said pockets and reduce the combined extent of such pockets between such anchored upper and lower portions of said liner, thereby moving said liner away from such portion of the container for dumping material from said liner.

21. Unloading mechanism for a horizontally elongated container to hold discrete particle material and having ends, side wall portions and bottom wall portions, a liner having a lower portion anchored to the bottom wall portion of the container and an upper portion anchored to a portion of the container wall above the anchored lower portion and spaced from the container ends, said liner being of a length to engage the portion of the container wall between said upper and lower anchored liner portions, said liner including a pocket having opposite sides and inflatable to spread such opposite sides for moving said liner away from such portion of the container wall between said side and bottom wall portions of the container for dumping material from said liner, and means connecting such opposite sides of said pocket for limiting their spreading movement to substantially parallel planar positions.

23. Unloading mechanism for a horizontally elongated container to hold discrete particle material and having ends, side wall portions and bottom wall portions, a liner having a lower portion anchored to the bottom wall portion of the container and an upper portion anchored to a portion of the container wall above the anchored lower portion and spaced from the container ends, said liner being of a length to engage the portion of the container wall between said upper and lower anchored liner portions, said liner including a plurality of elongated pockets joined in side-by-side relationship arranged with their lengths extending between such side and bottom wall portions of the container and inflatable to move said liner away from the portion of the container wall between said side and bottom wall portions of the container for dumping material from said liner.

23. Unloading mechanism for a horizontally elongated container to hold discrete particle material having two spaced-apart, substantially upright walls, two cup-shaped membranes, each of an axial extent less than one-half of the horizontal longitudinal distance between such container walls, two spaced attaching means attaching the edge portions of said membranes to the container substantially in upright planes located to enable said membranes to be disposed in wall-lining relationship to such two walls, respectively, discharge means located at the bottom of said container and extending over most of the distance between said attaching means for removal of discrete particle material from the container, and means operable to subject said membranes selectively to differential fluid pressure for effecting inversion of said membranes, one at a time, to dump discrete particle material therefrom for discharge through said discharge means.

24. The unloading mechanism defined in claim 23, the two attaching means being spaced apart horizontally a distance at least not appreciably greater than the axial extent of each of the membranes.

25. The unloading mechanism defined in claim 23, the two attaching means being spaced apart horizontally a distance less than the axial extent of each of the membranes but exceeding one-half of the axial extent of each membrane.

26. The unloading mechanism defined in claim 23, the discharge means including a discharge port opening through the lower portion of the container between the two attaching means and immediately adjacent to at least one of the attaching means.

27. Unloading mechanism for a horizontally elongated container to hold discrete particle material having a discharge port in its lower portion and a loading port in its upper portion, cup-shaped membrane means of an axial extent less than one-half of the horizontal extent of the container, disposed between such loading port and such discharge port, having its edge portions secured to the container and having a passage through said membrane means for movement of material therethrough from said loading port prior to discharge of such material from the container through such discharge port.

28. The unloading mechanism defined in claim 27, the passage including a neck of accordion character attached to the container wall encircling the loading port and to the membrane.

29. In unloading mechanism for a container to hold discrete particle material, outlet pipe means connected to the container including two outlet pipes beneath the container, a Y connection between said outlet pipes, and means connecting each of said outlet pipes to a different branch of said Y connection and having swivels enabling said Y connection to swing its common outlet from one side of the container to the other.

30. In the method of unloading discrete particle material from a container through a bottom discharge port, the steps which comprise providing a membrane in the container having a portion overlying and engageable with the upper surface of the discrete particle material in the container, and subjecting the side of the membrane engaged with the discrete particle material to a suction source for producing thereon a pressure less than that on the opposite side of the membrane and thereby progressively pressing the membrane against the discrete particle material and moving such overlying portion of the membrane downward to follow the discrete particle material in engagement therewith as the body of such material recedes during discharge.

31. The method of unloading discrete particle material through a discharge outlet by suction from a container incapable of withstanding appreciable external pressure, which comprises providing a membrane within such container having its marginal portion sealed to the container wall with the material in the container between the membrane and the discharge outlet, applying suction to the container at the discharge outlet side of the membrane, and venting to atmosphere the space between the container wall and the side of the membrane opposite the discharge outlet.

32. The method of unloading a container through a bottom discharge port, which comprises providing a flexible cup-shaped membrane having its marginal portion secured to the wall of the container adjacent to the discharge port, applying to the membrane a fluid pressure differential by providing a fluid pressure on the side of the membrane opposite the discharge port higher than the fluid pressure on the side of the membrane adjacent to the discharge port and thereby pressing the membrane against material in the container in a direction urging it toward the discharge port and moving over the discharge port an upper portion of the membrane spaced upwardly from the discharge port and simultaneously preventing blocking of the discharge port by a lower portion of the membrane below such upper membrane portion.

33. In the method defined in claim 32, the step of restraining movement toward the discharge port of that portion of the membrane adjacent to the discharge port by stiffening such membrane portion controllably.

34. The method of unloading discrete particle material from a horizontally elongated chamber having a bottom outlet located generally centrally between its ends, which comprises providing at opposite sides of such outlet, respectively, two membranes of cup shape having their marginal portions secured to the wall of the chamber in substantially upright planes spaced from the chamber ends, applying differential fluid pressure to a first one of such membranes by providing a pressure on its side opposite the outlet higher than on its outlet side and thereby moving such membrane toward inverted condition for impelling discrete particle material from a first side of the outlet toward the outlet, reversing the differential pressure on such first membrane and thereby moving it away from the outlet, and then applying differential fluid pressure to the second one of such membranes by providing a pressure on its side opposite the outlet higher than on its outlet side and thereby inverting such second membrane and impelling discrete particle material from such chamber at the second side of such outlet into a position for discharge through such outlet.

35. The method of unloading discrete particle material from a horizontally elongated chamber having a bottom outlet located generally centrally between its ends, which comprises providing at opposite sides of such outlet, respectively, two membranes of cup shape having their marginal portions secured to the wall of the chamber in substantially upright planes spaced from the chamber ends, applying differential fluid pressure to a first one of such membranes by providing a pressure on its side opposite the outlet higher than on its outlet side and thereby moving such membrane toward inverted condition for impelling discrete particle material from a first side of the outlet toward the outlet, reversing the differential pressure on such first membrane and thereby moving it away from the outlet, then applying differential fluid pressure to the second one of such membranes by providing a pressure on its side opposite the outlet higher than on its outlet side and thereby inverting such second membrane and impelling discrete particle material from such chamber at the second side of such outlet, reversing the differential pressure on such second membrane and thereby moving it away from the outlet, and again exerting a pressure differential on the first membrane which is higher on its side opposite the outlet than on its outlet side and thereby impelling additional discrete particle material toward the outlet.

36. In the method of unloading discrete particle material from a container having an outlet therein, the steps of providing a membrane within such container having its marginal portion sealed to the container wall, and applying to opposite sides of the membrane a fluid-pressure differential in which the pressure on the side of the membrane away from the outlet is greater than the pressure on the outlet side of the membrane for pressing the membrane against the discrete particle material to move it toward the outlet, but the difference in pressure on opposite sides of the membrane is insufficient to produce a stress on the textile of the membrane resulting in a fiber load or tenacity appreciably exceeding 1.5 grams per denier, which load will not produce an elongation exceeding 3%.

37. Unloading mechanism for a horizontally-elongated container to hold discrete particle material comprising a flexible cup-shaped membrane adapted to be disposed in container-lining relationship with an end wall and with portions of the top, bottom and side walls of the container and having an end wall in upright position when in such container-lining relationship and top and bottom side walls extending from said membrane end wall in generally horizontal position when in such container-lining relationship, said side walls of said membrane being of an axial extent less than one-half of the horizontal extent of the container, attaching means spaced from said upright membrane end wall when in such container-lining relationship and securing the edge portions of said side walls to the wall of the container substantially in an upright plane spaced from such container end wall, and discharge means located at the bottom of the container at the side of said attaching means opposite said membrane end wall in container-lining relationship and extending lengthwise of the container over a distance equal to at least the major portion of the axial extent of said membrane for removal of material from the container by inversion of said membrane from wall-lining relationship into a position in which a portion of the bottom of said membrane is in overlying registry with said discharge means.

38. In a container for receiving discrete particle material, discharge means located generally centrally of the container for removal of material therefrom, and two cup-shaped membranes having their edge portions secured to the wall of said container at opposite sides of said discharge means, respectively, each of said membranes being of sufficient axial extent as to enable a portion thereof to be moved from a container wall-lining position at one side of said discharge means into a position substantially beyond vertical registry with said discharge means.

39. A vehicle comprising a compartment having a central discharge port in its lower portion and a filler port in its upper portion, two cup-shaped membrane elements having upper and lower edges, spaced joint means securing said upper edges and said lower edges of said membrane elements to the wall of said compartment adjacent to opposite sides of said discharge port, respectively, so that such discharge port extends over the major portion of the distance between said joint means, said membrane elements being of an extent to be disposed in one position in lining relationship to walls of said compartment at opposite sides of said discharge port and to extend over said discharge port in an opposite position, and means for supplying fluid to the respective spaces between the membrane elements and the compartment wall for moving the membrane partitions toward the discharge port.

References Cited

UNITED STATES PATENTS

| | | | |
|---|---|---|---|
| 2,621,719 | 12/1952 | Eaton et al. | 222—386.5 X |
| 2,720,375 | 10/1955 | Carter | 141—68 |
| 2,792,262 | 5/1957 | Hathorn. | |
| 3,199,726 | 9/1965 | Pierson | 222—95 X |

FOREIGN PATENTS

| | | |
|---|---|---|
| 1,030,210 | 6/1953 | France. |

WALTER SOBIN, *Primary Examiner.*

HADD S. LANE, ROBERT B. REEVES, *Examiners.*

UNITED STATES PATENT OFFICE
CERTIFICATE OF CORRECTION

Patent No. 3,351,235                        November 7, 1967

Hamilton Neil King Paton

It is hereby certified that error appears in the above numbered patent requiring correction and that the said Letters Patent should read as corrected below.

Column 34, line 34, for "23." read -- 22. --.

Signed and sealed this 3rd day of December 1968.

(SEAL)
Attest:

Edward M. Fletcher, Jr.                        EDWARD J. BRENNER
Attesting Officer                                 Commissioner of Patents